(12) United States Patent
Han et al.

(10) Patent No.: US 8,982,788 B2
(45) Date of Patent: Mar. 17, 2015

(54) METHOD AND APPARATUS FOR TRANSMITTING POSITIONING REFERENCE SIGNAL IN WIRELESS COMMUNICATION SYSTEM

(75) Inventors: Seung Hee Han, Anyang-si (KR); Dae Won Lee, Anyang-si (KR); Yeong Hyeon Kwon, Anyang-si (KR)

(73) Assignee: LG Electronics Inc., Seoul (KR)

( * ) Notice: Subject to any disclaimer, the term of this patent is extended or adjusted under 35 U.S.C. 154(b) by 311 days.

(21) Appl. No.: 13/263,727

(22) PCT Filed: Apr. 9, 2010

(86) PCT No.: PCT/KR2010/002201
§ 371 (c)(1),
(2), (4) Date: Oct. 7, 2011

(87) PCT Pub. No.: WO2010/117236
PCT Pub. Date: Oct. 14, 2010

(65) Prior Publication Data
US 2012/0027110 A1    Feb. 2, 2012

Related U.S. Application Data

(60) Provisional application No. 61/168,356, filed on Apr. 10, 2009, provisional application No. 61/173,607, filed on Apr. 29, 2009, provisional application No. 61/176,450, filed on May 7, 2009.

(30) Foreign Application Priority Data

Apr. 8, 2010  (KR) .................. 10-2010-0032290

(51) Int. Cl.
*H04W 4/00* (2009.01)
*H04L 5/00* (2006.01)
(Continued)

(52) U.S. Cl.
CPC ........... *H04L 5/0053* (2013.01); *H04J 11/0079* (2013.01); *H04L 27/2602* (2013.01); *H04L 27/2656* (2013.01); *H04L 27/2675* (2013.01)
USPC ............ 370/328; 375/260; 455/524; 455/525

(58) Field of Classification Search
CPC .............. H04J 11/0079; H04L 5/0053; H04L 27/2675; H04L 27/2656; H04L 27/2602
USPC ........ 370/328–334; 375/260; 455/422.1–460, 455/524–525
See application file for complete search history.

(56) References Cited

U.S. PATENT DOCUMENTS

2008/0132247 A1    6/2008  Anderson
2010/0172311 A1*   7/2010  Agrawal et al. ............... 370/329
(Continued)

FOREIGN PATENT DOCUMENTS

| CN | 101299634 | 11/2008 |
|---|---|---|
| KR | 10-0601939 | 7/2006 |

(Continued)

OTHER PUBLICATIONS

3GPP TS 36.211 V8.6.0 (Mar. 2009).*
3GPP TSG-RAN WG #57 (May 4, 2009).*
Motorola, "Study on hearability of reference signals in LTE positioning support", R1-091336, 3GPP TSG RAN1 #56bis, Mar. 2009, XP50338934.
Nortel, "LTE neighbor cell hearability", R1-090765, 3GPP TSG-RAN1 #56, Feb. 2009, XP50318626.
(Continued)

*Primary Examiner* — Mang Yeung
(74) *Attorney, Agent, or Firm* — Lee, Hong, Degerman, Kang & Waimey

(57) ABSTRACT

Provided are a method and an apparatus for transmitting a positioning reference signal (PRS) in a wireless communication system. A terminal obtains positioning subframe configuration information to determine at least one positioning subframe among a plurality of downlink subframes in a wireless frame, obtains downlink subframe configuration information to determine the type of each downlink subframe in the wireless frame, receives PRSs in at least one positioning subframe from a plurality of cells, and reports measured time differences between the PRSs received from the plurality of the cells. The type of each downlink subframe of the wireless frame is classified into a $1^{st}$ type subframe and a $2^{nd}$ type subframe, and the type of at least one positioning subframe is either the $1^{st}$ type subframe or the $2^{nd}$ type subframe. In addition, the PRSs are mapped into at least one positioning subframe on the basis of a single PRS pattern.

14 Claims, 25 Drawing Sheets

(51) Int. Cl.
*H04J 11/00* (2006.01)
*H04L 27/26* (2006.01)

(56) References Cited

U.S. PATENT DOCUMENTS

2010/0239034 A1* 9/2010 Lee et al. .................. 375/260
2010/0260154 A1* 10/2010 Frank et al. ............... 370/336

FOREIGN PATENT DOCUMENTS

| KR | 10-0602189 | 7/2006 |
| KR | 10-2007-0023485 | 2/2007 |
| WO | 2008/156412 | 12/2008 |

OTHER PUBLICATIONS

Qualcomm Europe, "PHY layer specification impact of positioning improvements", R1-090852, 3GPP TSG-RAN WG1 #56, Feb. 2009, XP50318705.

Ericsson, "Reference Signals for Low Interference Subframes in Downlink", R1-091314, 3GPP TSG RAN WG1 Meeting #56bis, Mar. 2009, XP002636007.

European Patent Office Application Serial No. 10761897.7, Search Report dated Sep. 26, 2012, 8 pages.

The State Intellectual Property Office of the People's Republic of China Application Serial No. 201080020536.X, Office Action dated Feb. 24, 2014, 6 pages.

* cited by examiner

Antenna 0

Normal subframe

MBSFN subframe

▨ Cell-specific RS  ░ Possible REs for PRS
◸ PCFICH/PHICH/PDCCH  ☐ No transmission
▩ Blocking OFDM symbol in PRS transmission

METHOD AND APPARATUS FOR TRANSMITTING POSITIONING REFERENCE SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2010/002201, filed on Apr. 9, 2010, which claims the benefit of U.S. Provisional Application Nos. 61/168,356, filed on Apr. 10, 2009, 61/173,607, filed on Apr. 29, 2009, and 61/176,450, filed on May 7, 2009, and also claims the benefit of earlier filing date and right of priority to Korean Patent Application No. 10-2010-0032290, filed on Apr. 8, 2010, the contents of which are all hereby incorporated by reference herein in their entirety.

BACKGROUND OF THE INVENTION

1. Field of the Invention

The present invention relates to wireless communication and, more particularly, to a method and apparatus for transmitting a positioning reference signal in a wireless communication system.

2. Related Art

The next-generation multimedia wireless communication systems which are recently being actively researched are required to process and transmit various pieces of information, such as video and wireless data as well as the initial voice-centered services. The $4^{th}$ generation wireless communication systems which are now being developed subsequently to the $3^{rd}$ generation wireless communication systems are aiming at supporting high-speed data service of downlink 1 Gbps (Gigabits per second) and uplink 500 Mbps (Megabits per second). The object of the wireless communication system is to establish reliable communications between a number of users irrespective of their positions and mobility. However, a wireless channel has abnormal characteristics, such as path loss, noise, a fading phenomenon due to multi-path, Inter-Symbol Interference (ISI), and the Doppler Effect resulting from the mobility of a user equipment. A variety of techniques are being developed in order to overcome the abnormal characteristics of the wireless channel and to increase the reliability of wireless communication.

Technology for supporting reliable and high-speed data service includes Orthogonal Frequency Division Multiplexing (OFDM), Multiple Input Multiple Output (MIMO), and so on. An OFDM system is being considered after the $3^{rd}$ generation system which is able to attenuate the ISI effect with low complexity. The OFDM system converts symbols, received in series, into N (N is a natural number) parallel symbols and transmits them on respective separated N subcarriers. The subcarriers maintain orthogonality in the frequency domain. It is expected that the market for mobile communication will shift from the existing Code Division Multiple Access (CDMA) system to an OFDM-based system. MIMO technology can be used to improve the efficiency of data transmission and reception using multiple transmission antennas and multiple reception antennas. MIMO technology includes spatial multiplexing, transmit diversity, beam-forming and the like. An MIMO channel matrix according to the number of reception antennas and the number of transmission antennas can be decomposed into a number of independent channels. Each of the independent channels is called a layer or stream. The number of layers is called a rank.

In wireless communication systems, it is necessary to estimate an uplink channel or a downlink channel for the purpose of the transmission and reception of data, the acquisition of system synchronization, and the feedback of channel information. In wireless communication system environments, fading is generated because of multi-path time latency. A process of restoring a transmit signal by compensating for the distortion of the signal resulting from a sudden change in the environment due to such fading is referred to as channel estimation. It is also necessary to measure the state of a channel for a cell to which a user equipment belongs or other cells. To estimate a channel or measure the state of a channel, a Reference Signal (RS) which is known to both a transmitter and a receiver can be used.

A subcarrier used to transmit the reference signal is referred to as a reference signal subcarrier, and a subcarrier used to transmit data is referred to as a data subcarrier. In an OFDM system, a method of assigning the reference signal includes a method of assigning the reference signal to all the subcarriers and a method of assigning the reference signal between data subcarriers. The method of assigning the reference signal to all the subcarriers is performed using a signal including only the reference signal, such as a preamble signal, in order to obtain the throughput of channel estimation. If this method is used, the performance of channel estimation can be improved as compared with the method of assigning the reference signal between data subcarriers because the density of reference signals is in general high. However, since the amount of transmitted data is small in the method of assigning the reference signal to all the subcarriers, the method of assigning the reference signal between data subcarriers is used in order to increase the amount of transmitted data. If the method of assigning the reference signal between data subcarriers is used, the performance of channel estimation can be deteriorated because the density of reference signals is low. Accordingly, the reference signals should be properly arranged in order to minimize such deterioration.

A receiver can estimate a channel by separating information about a reference signal from a received signal because it knows the information about a reference signal and can accurately estimate data, transmitted by a transmit stage, by compensating for an estimated channel value. Assuming that the reference signal transmitted by the transmitter is p, channel information experienced by the reference signal during transmission is h, thermal noise occurring in the receiver is n, and the signal received by the receiver is y, it can result in y=h·p+n. Here, since the receiver already knows the reference signal p, it can estimate a channel information value ĥ using Equation 1 in the case in which a Least Square (LS) method is used.

$$\hat{h}=y/p=h+n/p=h+\hat{n} \qquad \text{[Equation 1]}$$

The accuracy of the channel estimation value ĥ estimated using the reference signal p is determined by the value n̂. To accurately estimate the value h, the value n̂ must converge on 0. To this end, the influence of the value n̂ has to be minimized by estimating a channel using a large number of reference signals. A variety of algorithms for a better channel estimation performance may exist.

Meanwhile, UE positioning for estimating a location of a UE has been recently used for diverse purposes in real life, and thus, a precise UE positioning method is required. A UE positioning technique may be divided into the following four methods.

1) Cell ID-based method: A cell ID-based method uses a cell coverage. A location of a UE can be estimated from information regarding a serving cell which serves the corresponding UE. The information regarding the serving cell may be obtained through paging, locating area updating, cell updating, URA updating, routing area updating, or the like. Positioning information based on a cell coverage may be indicated through a cell identity of the cell in use, a service area identity, or geographical coordinates in relation to the serving cell. The positioning information may include QoS (Quality of Service) estimation information, and may include information regarding a positioning method used to estimate a position if possible. When geographical coordinates are used as positioning information, an estimated location of a UE may be any one of a certain fixed location within the serving cell, a geographic central point of the coverage of the serving cell, or a different fixed location within the cell coverage. Also, the geographical location may be obtained by combining information regarding the cell-specific fixed geographical location and different information. The different information may be information such as an RTT (Round Trip Time) of a signal in an FDD (Frequency Division Duplex) mode, a reception timing deviation in a TDD mode, or the like.

2) OTDOA-IPDL (Observed Time Difference of Arrival-Idle Periods in Downlink) method: FIG. 1 shows the concept of a location estimation of a UE by an OTDOA-IPDL method. A location of a UE is estimated by using the difference in timing between signals transmitted from base stations (BSs). When the UE is located to be very close to the serving cell, a hearability problem in which the UE cannot properly receive a signal transmitted by a neighbor cell due to the intensive transmission power of the serving cell may arise. This is because an ADC level is determined based on the serving cell and signals transmitted from neighbor cells are received at a level lower than the ADC level, making it impossible to discriminate the signals. Thus, in order to solve this problem, IPDL may be applied to downlink of the serving cell. IPDL can be set in a network. In the OTDOA-IPDL method, when an idle period is not used, the OTDOA-IPDL method is a simple OTDOA method.

3) Network-supported GNSS (Global Navigation Satellite System) method: In this method, a terminal including a receiver capable of receiving a GNSS signal is used. In order to estimate a location of the terminal, various types of GNSS signals may be independently used or combined to be used.

4) U-TDOA method: This method is given on the basis that a network measures a TOA (Time of Arrival) of a signal which is transmitted from a UE and received by four or more BSs. In this method, in order to accurately measure a TOA of data, a BS which is geographically close to the UE is required. Since geographical coordinates of a measurement unit are already known, a location of the UE can be estimated by hyperbolic trilateration.

In order to estimate a location of a UE, a reference signal may be used. The reference signal may include a synchronization signal. The UE may receive reference signals transmitted from a plurality of cells, and use the difference in a delay time of each signal. The UE may report the difference in the corresponding delay time to the BS to allow the BS to calculate a location of the UE, or the UE itself may calculate its location. With reference to Paragraph LTE TS36.355 V9.0.0 (2009-12) 4.1.1, measurement values such as the difference in the delay time of reference signals (RSTD; Reference Signal Time Difference), transmitted from each cell, measured by the UE can be controlled by E-SMLC (Enhanced Serving Mobile Location Centre) through LPP (LTE Positioning Protocol). The LPP may be defined in a point-to-point manner between a location server such as E-SMLC, or the like, and a target device such as a UE, or the like, in order to a location of the target device by using a location relationship measurement value obtained from one or more reference signals.

The pattern of reference signals transmitted from a plurality of cells to a UE is required to be designed in consideration of a power difference, a delay difference, or the like. A method for effectively designing the structure of a reference signal is required.

SUMMARY OF THE INVENTION

The present invention provides a method and apparatus for transmitting a positioning reference signal (PRS) in a wireless communication system.

In an aspect, a method of reporting a timing difference among the reception of positioning reference signals (PRSs) from a plurality of cells is provided. The method includes acquiring positioning subframe configuration information for determining at least one positioning subframe among a plurality of downlink subframes in a radio frame, acquiring downlink subframe configuration information for determining a type of each of the plurality of downlink subframes in the radio frame, receiving the PRSs from the plurality of cells in the at least one positioning subframe, and reporting the timing difference measured among the reception of the PRSs from the plurality of cells, wherein each of the plurality of downlink subframes comprising a plurality of orthogonal frequency division multiplexing (OFDM) symbols in time domain, each of the plurality of OFDM symbols comprising a plurality of subcarriers in frequency domain, wherein the type of each of the plurality of downlink subframes in the radio frame is classified into a first type subframe and a second type subframe, and a type of the at least one positioning subframe is the first type subframe or the second type subframe, and wherein the PRSs are mapped to the at least one positioning subframe based on a single PRS pattern. The number of a plurality of positioning subframes in at least one radio frame may be more than two, and a cyclic prefix (CP) length of a OFDM symbol in each of the plurality of positioning subframes may be the same as a CP length of a OFDM symbol of a first subframe in the at least one radio frame if a type of one of the plurality of positioning subframes is the first type subframe and a type of one of the remained plurality of positioning subframes is the second type subframe. A type of the first subframe in the at least one radio frame may be the first type subframe. The plurality of positioning subframes may be consecutive. Each of the plurality of downlink subframes may comprise a control region and a data region, and a cell-specific reference signal (CRS) for measuring downlink channel may be transmitted in a data region of the first type subframe but the CRS may not be transmitted in a data region of the second type subframe. The single PRS pattern may be determined regardless of the type of the at least one positioning subframe. The single PRS pattern may include a sequence of OFDM symbols where the PRSs are mapped, and the PRS may be mapped to the sequence of OFDM symbols in the single PRS pattern with 6 subcarrier interval regularly. The single PRS pattern may be determined based on a CP length of an OFDM symbol in the at least one positioning subframe and the number of physical broadcast channel (PBCH) transmission antenna ports. The single PRS pattern may include the a sequence of fourth OFDM symbol, sixth OFDM symbol, seventh OFDM symbol, ninth OFDM symbol, tenth OFDM symbol, eleventh OFDM symbol, thirteenth OFDM symbol and fourteenth OFDM symbol if the CP length of a OFDM symbol in the at least one positioning subframe is a first CP length, and the single PRS pattern may include the a sequence of fifth OFDM symbol, sixth OFDM symbol, eighth OFDM symbol, ninth OFDM symbol, eleventh OFDM symbol, and twelfth OFDM symbol if the CP length of a OFDM symbol in the at least one positioning subframe is a second CP length, wherein the second CP length is longer than the first CP length if the number of physical broadcast channel (PBCH) transmission antenna ports is one or two. The single PRS pattern may include the a sequence of fourth OFDM symbol, sixth OFDM symbol, seventh OFDM symbol, tenth OFDM symbol, eleventh OFDM symbol, thirteenth OFDM symbol and fourteenth OFDM symbol if the CP length of a OFDM symbol in the at least one positioning subframe is a first CP length, and the single PRS pattern may include the a sequence of fifth OFDM symbol, sixth OFDM symbol, ninth OFDM symbol, eleventh OFDM symbol, and twelfth OFDM symbol if the CP length of a OFDM symbol in the at least one positioning subframe is a second CP length, wherein the second CP length is longer than the first CP length if the number of physical broadcast channel (PBCH) transmission antenna ports is four.

In another aspect, an apparatus of reporting a timing difference among the reception of positioning reference signals (PRSs) from a plurality of cells is provided. The apparatus includes a receive circuitry configured to receive PRSs from a plurality of cells in at least one positioning subframe, a transmit circuitry configured to report a timing difference among the reception of the PRSs from the plurality of cells, and a processor configured to acquire positioning subframe configuration information for determining at least one positioning subframe among a plurality of downlink subframes in a radio frame, acquire downlink subframe configuration information for determining a type of each of the plurality of downlink subframes in the radio frame, receive the PRSs from the plurality of cells in the at least one positioning subframe, and report the timing difference measured among the reception of the PRSs from the plurality of cells, wherein each of the plurality of downlink subframes comprising a plurality of orthogonal frequency division multiplexing (OFDM) symbols in time domain, each of the plurality of OFDM symbols comprising a plurality of subcarriers in frequency domain, wherein the type of each of the plurality of downlink subframes in the radio frame is classified into a first type subframe and a second type subframe, and a type of the at least one positioning subframe is the first type subframe or the second type subframe, and wherein the PRSs are mapped to the at least one positioning subframe based on a single PRS pattern.

In another aspect, a method of transmitting positioning reference signal (PRS) in a wireless communication system is provided. The method includes determining at least one positioning subframe among a plurality of downlink subframes in a radio frame, generating a PRS, mapping the PRS to the at least one positioning subframe based on a single PRS pattern, and transmitting the mapped PRS in the at least one positioning subframe, wherein each of the plurality of downlink subframes comprising a plurality of OFDM symbols in time domain, each of the plurality of OFDM symbols comprising a plurality of subcarriers in frequency domain, wherein a type of each of the plurality of downlink subframes in the radio frame is classified into a first type subframe and a second type subframe, and wherein a type of the positioning subframe is the first type subframe or the second type subframe.

According to embodiments of the present invention, by applying the same PRS pattern to a normal subframe and an MBSFN (Multimedia Broadcast multicast service Single Frequency Network), a UE can estimate its location in a subframe set as a PRS subframe regardless of a type of the subframe.

DESCRIPTION OF EXEMPLARY EMBODIMENTS

The following technique may be used for various wireless communication systems such as code division multiple access (CDMA), a frequency division multiple access (FDMA), time division multiple access (TDMA), orthogonal frequency division multiple access (OFDMA), single carrier-frequency division multiple access (SC-FDMA), and the like. The CDMA may be implemented as a radio technology such as universal terrestrial radio access (UTRA) or CDMA2000. The TDMA may be implemented as a radio technology such as a global system for mobile communications (GSM)/general packet radio service (GPRS)/enhanced data rates for GSM evolution (EDGE). The OFDMA may be implemented by a radio technology such as IEEE (Institute of Electrical and Electronics Engineers) 802.11 (Wi-Fi), IEEE 802.16 (WiMAX), IEEE 802.20, E-UTRA (Evolved UTRA), and the like. IEEE 802.16m, an evolution of IEEE 802.16e, provides backward compatibility with a system based on IEEE 802.16e. The UTRA is part of a universal mobile telecommunications system (UMTS). 3GPP ($3^{rd}$ Generation, Partnership Project) LTE (Long Term Evolution) is part of an evolved UMTS (E-UMTS) using the E-UTRA, which employs the OFDMA in downlink and the SC-FDMA in uplink. LTE-A (Advanced) is an evolution of 3GPP LTE.

Hereinafter, for clarification, LET-A will be largely described, but the technical concept of the present invention is not meant to be limited thereto.

Figure 1:
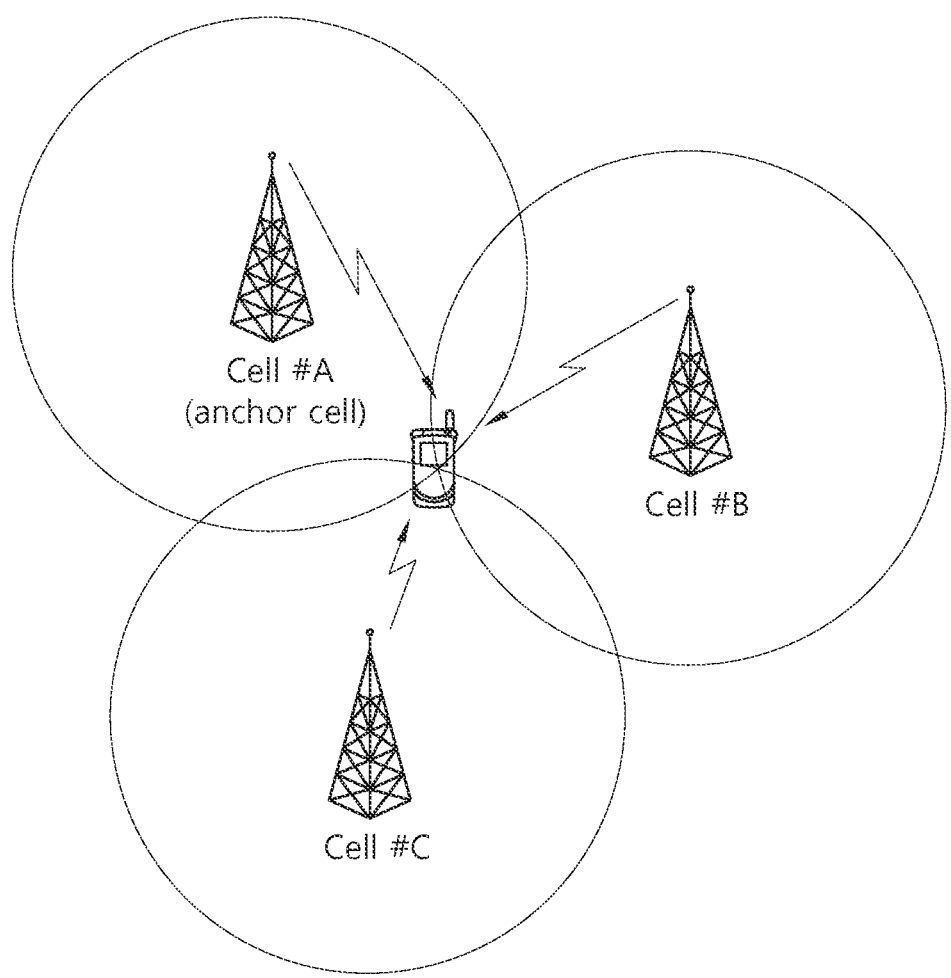
FIG. 1 shows the concept of a location estimation of a UE by an ODDOA-IPDL method.
Figure 2:
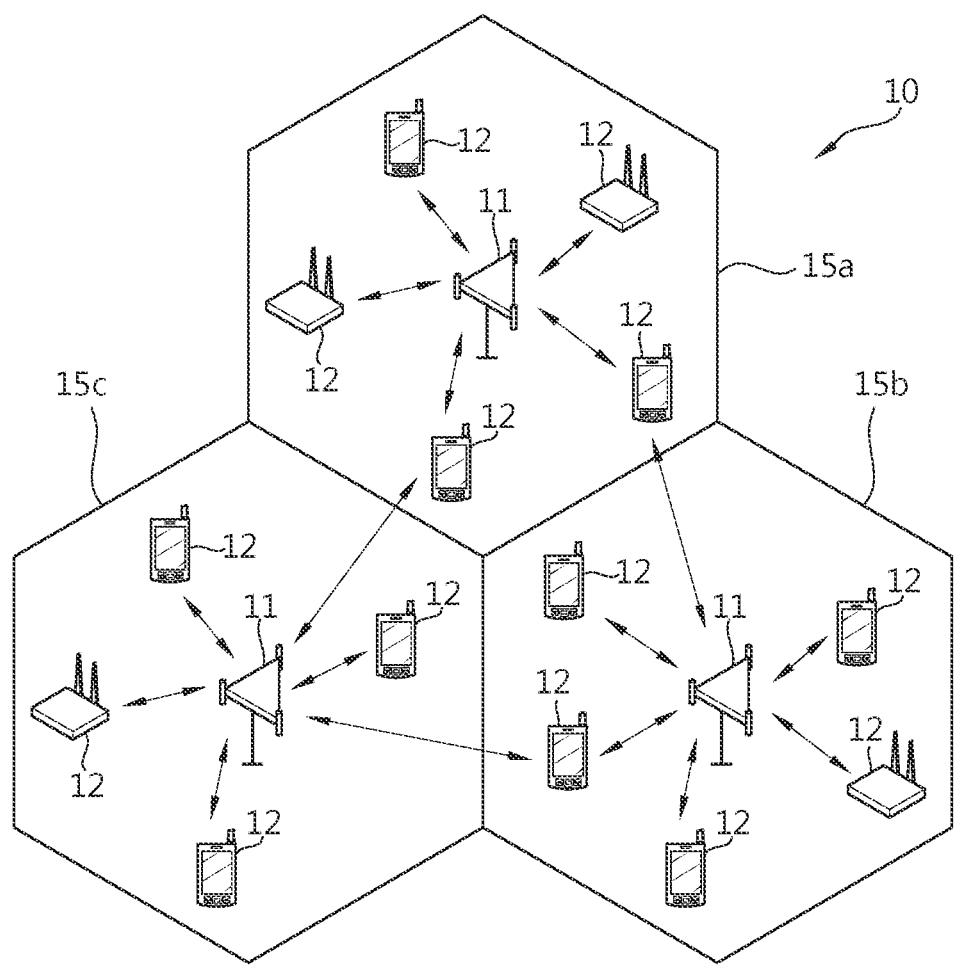
FIG. 2 shows a wireless communication system.

FIG. 2 shows a wireless communication system.

Referring to FIG. 2, the wireless communication system 10 includes one or more Base Stations (BSs) 11. The BSs 11 provide communication services to respective geographical areas (in general called 'cells') 15a, 15b, and 15c. Each of the cells can be divided into a number of areas (called 'sectors'). A User Equipment (UE) 12 can be fixed or mobile and may be referred to as another terminology, such as a Mobile Station (MS), a Mobile Terminal (MT), a User Terminal (UT), a Subscriber Station (SS), a wireless device, a Personal Digital Assistant (PDA), a wireless modem, or a handheld device. In general, the BS 11 refers to a fixed station that communicates with the UEs 12, and it may be referred to as another terminology, such as an evolved-NodeB (eNB), a Base Transceiver System (BTS), or an access point.

The UE generally belongs to one cell. A cell to which a UE belongs is called a serving cell. A BS providing the serving cell with communication services is called a serving BS. A wireless communication system is a cellular system, and so it includes other cells neighboring a serving cell. Other cells neighboring the serving cell are called neighbor cells. A BS providing the neighbor cells with communication services is called as a neighbor BS. The serving cell and the neighbor cells are relatively determined on the basis of a UE.

This technology can be used in the downlink (DL) or the uplink (UL). In general, DL refers to communication from the BS 11 to the UE 12, and UL refers to communication from the UE 12 to the BS 11. In the DL, a transmitter may be part of the BS 11 and a receiver may be part of the UE 12. In the UL, a transmitter may be part of the UE 12 and a receiver may be part of the BS 11.

Figure 3:
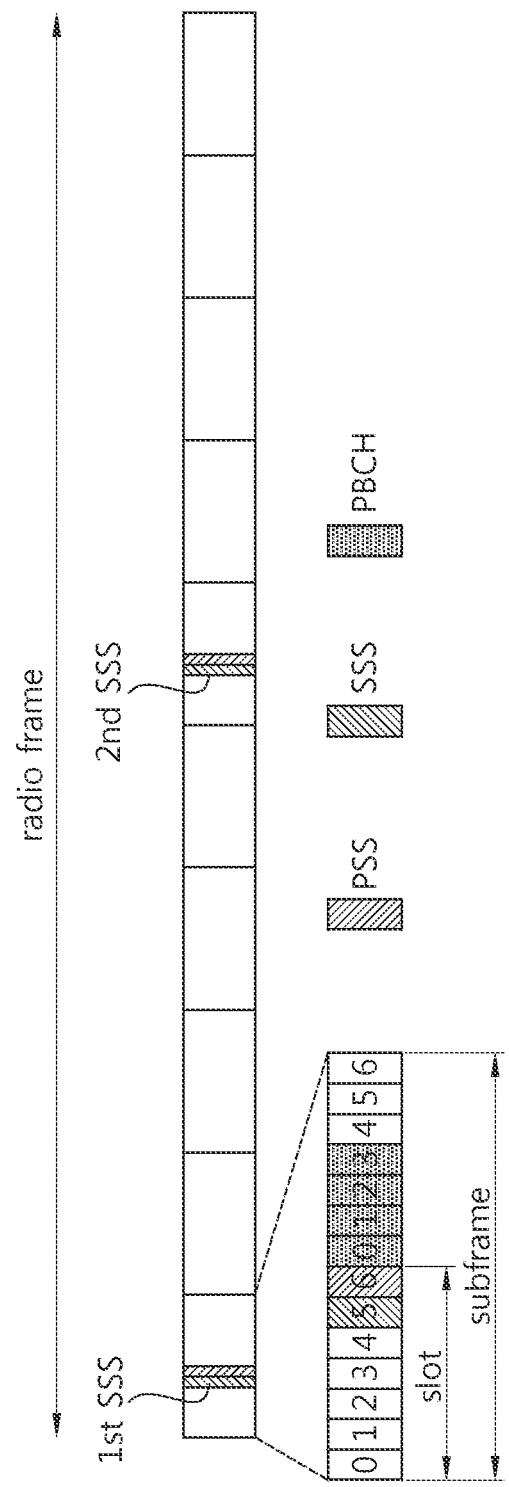
FIG. 3 shows the structure of a radio frame in the 3GPP LTE specifications.

FIG. 3 shows the structure of a radio frame in the 3GPP LTE specifications. For the radio frame structure, reference can be made to Paragraph 5 of 3GPP (3$^{rd}$ Generation Partnership Project) TS 36.211 V8.2.0 (2008-03) "Technical Specification Group Radio Access Network; Evolved Universal Terrestrial Radio Access (E-UTRA); Physical channels and modulation (Release 8)".

Referring to FIG. 3, the radio frame includes ten sub-frames, and one sub-frame includes two slots. The slots within the radio frame are allocated slot numbers from #0 to #19. The time that it takes to transmit one sub-frame is called a Transmission Time Interval (TTI). The TTI can be called a scheduling unit for data transmission. For example, the length of one radio frame can be 10 ms, the length of one sub-frame can be 1 ms, and the length of one slot may be 0.5 ms.

One slot includes a plurality of Orthogonal Frequency Division Multiplexing (OFDM) symbols in the time domain and a plurality of subcarriers in the frequency domain. The OFDM symbol is used to represent one symbol period because the 3GPP LTE specifications use OFDMA in the downlink. The OFDM symbol can be called another terminology according to the multi-access method. For example, in the case in which SC-FDMA is used as an uplink multi-access method, corresponding symbols can be called SC-FDMA symbols. A Resource Block (RB) is the unit of resource allocation, and it includes a plurality of consecutive subcarriers in one slot. The structure of a radio frame is only an example. The number of sub-frames included in a radio frame, the number of slots included in a sub-frame, or the number of OFDM symbols included in a slot can be changed in various ways.

In the 3GPP LTE specifications, one slot is defined to include seven OFDM symbols in a normal Cyclic Prefix (CP), and one slot is defined to include six OFDM symbols in the extended CP.

A primary synchronization signal (PSS) is transmitted in the last OFDM symbols of a first slot (a first slot of a first subframe (a subframe having index 0) and an eleventh slot (a first slot of a sixth subframe (a subframe having index 5). The PSS is used to obtain OFDM symbol synchronization or slot synchronization, and is associated with a physical cell ID (Identification). The primary synchronization code (PSC) is a sequence used in the PSS, and 3GPP LTE has three PSCs. One of the three PSCs is transmitted in the PSS according to a cell ID. The same PSC is used in each of the last OFDM symbols of the first slot and the eleventh slot.

A secondary synchronization signal (SSS) includes a first SSS and a second SSS. The first SSS and the second SSS are transmitted in OFDM symbols adjacent to the OFDM symbols on which the PSS is transmitted. The SSS is used to obtain frame synchronization. The first SSS and the second SSS use a different secondary synchronization code (SSC), respectively. When the first SSS and the second SSS include 31 subcarriers, respectively, two SSC sequences having the length of 31 are used in the first SSS and the second SSS, respectively.

A physical broadcast channel (PBCH) is transmitted in front four OFDM symbols of the second slot of the first subframe. The PBCH carries system information requisite for the UE to communicate with the BS, and the system information transmitted via the PBCH is called a master information block (MIB). In comparison, system information transmitted via a physical downlink control channel (PDCCH) is called a system information block (SIB).

As disclosed in 3GPP TS 36.211 V8.5.0 (2008-12), in LTE, physical channels are divided into a physical downlink shared channel (PDSCH) and a physical uplink shared channel (PUSCH), data channels, and a PDCCH and a physical uplink control channel (PUCCH), control channels. Also, downlink control channels include a physical control format indicator channel (PCFICH) and a physical HARQ indicator channel (PHICH).

Control information transmitted via the PDCCH is called downlink control information (DCI). The DCI may include a resource allocation of PDSCH (which is called a downlink grant), a resource allocation of PUSCH (which is called an uplink grant), an aggregation of transmission power control commands with respect to individual UEs of a certain UE group, and/or activation of a VoIP (Voice over Internet Protocol).

Figure 4:
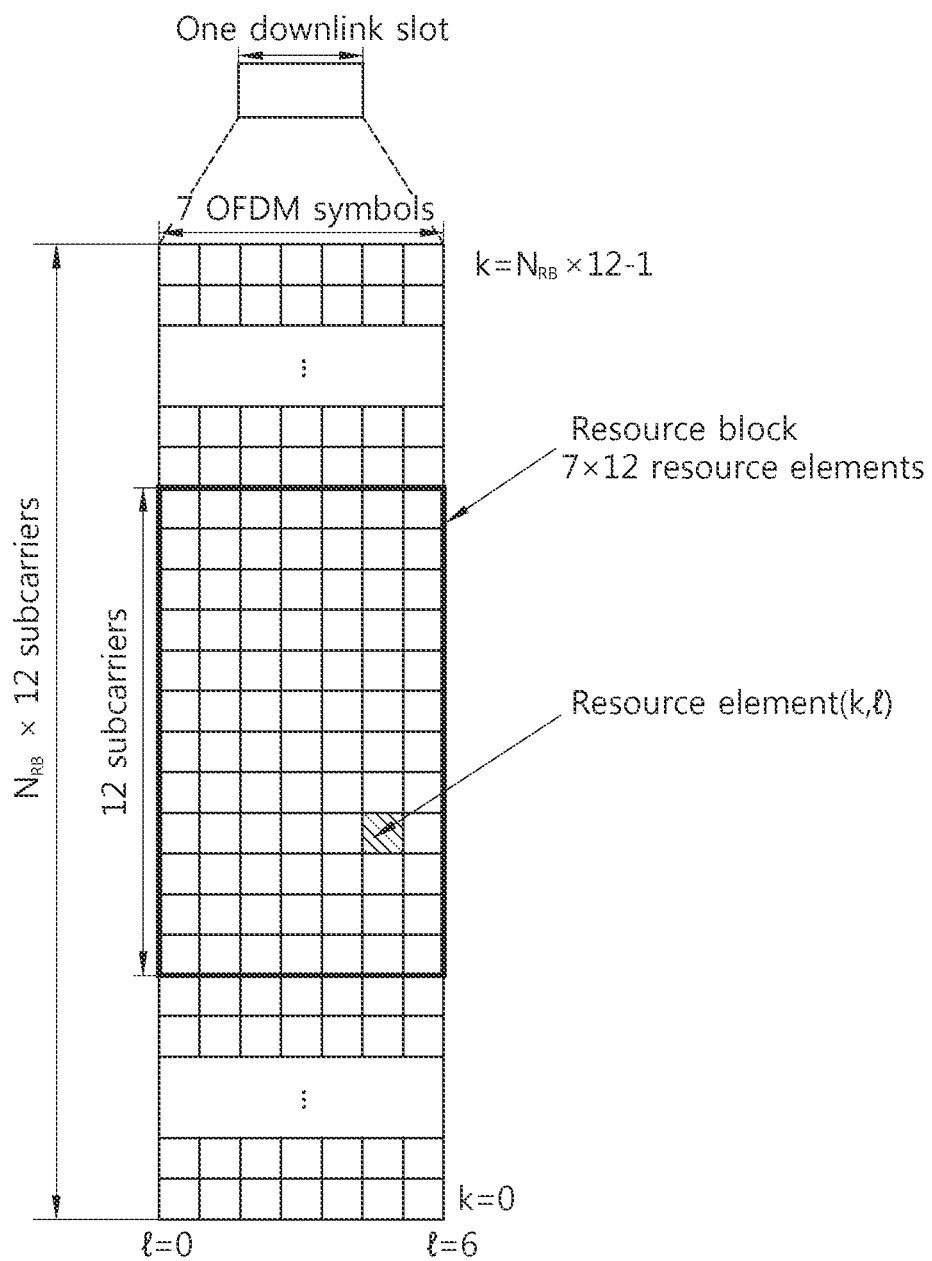
FIG. 4 shows an example of a resource grid for one downlink slot.

FIG. 4 shows an example of a resource grid for one downlink slot.

The downlink slot includes a plurality of OFDM symbols in the time domain and $N_{RB}$ resource blocks in the frequency domain. The number of resource blocks $N_{RB}$ included in a downlink slot is dependent on a downlink transmission bandwidth set in a cell. For example, in the LTE system, the number of resource blocks $N_{RB}$ may be one of 60 to 110. One resource block includes a plurality of subcarriers in the frequency domain. The structure of an uplink slot can be identical with that of the downlink slot.

Each of elements on the resource grid is called a resource element. The resource element on the resource grid can be identified by an index pair (k, l) within a slot. Here, $k(k=0, \ldots, N_{RB} \times 12-1)$ denotes a subcarrier index in the frequency domain, and $l(l=0, \ldots, 6)$ denotes an OFDM symbol index in the time domain.

In this case, one resource block is illustrated to include 7×12 resource elements, including 7 OFDM symbols in the time domain and 12 subcarriers in the frequency domain. However, the number of OFDM symbols and the number of subcarriers within a resource block are not limited to the 7×12 resource elements. The number of OFDM symbols and the number of subcarriers can be variously changed depending on the length of a CP, frequency spacing, and so on. For example, in the normal CP, the number of OFDM symbols can be 7, and in the extended CP, the number of OFDM symbols can be 6. In one OFDM symbol, the number of subcarriers can be one of 128, 256, 512, 1024, 1536, and 2048.

Figure 5:
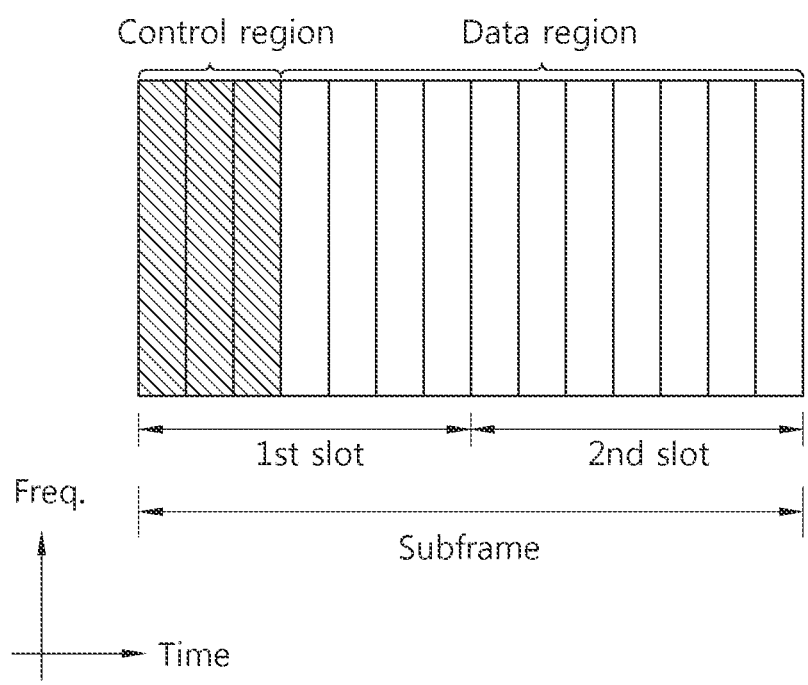
FIG. 5 shows the structure of a downlink sub-frame.

FIG. 5 shows the structure of a downlink sub-frame.

The downlink sub-frame includes two slots in the time domain. Each of the slots includes 7 OFDM symbols in the normal CP. A maximum of three OFDM symbols (maximum four OFDM symbols with respect to a 1.4 MHz bandwidth) of the first slot within the sub-frame correspond to a control region to which control channels are allocated, and the remaining OFDM symbols correspond to a data region to which PDSCHs are allocated. Downlink control channels used in the 3GPP LTE include a PCFICH, a PDCCH, a PHICH, and so on. The PCFICH transmitted in the first OFDM symbol of a sub-frame carries information about the number of OFDM symbols (that is, the size of a control region) which is used to transmit control channels within the sub-frame. The PHICH carries an Acknowledgement (ACK)/Not-Acknowledgement (NACK) signal for an uplink Hybrid Automatic Repeat Request (HARQ). In other words, an ACK/NACK signal for uplink data transmitted by a user equipment is transmitted on the PHICH. Control information transmitted through the PDCCH is called DCI. The DCI indicates uplink or downlink scheduling information, an uplink transmission power control command for specific user equipment groups, etc.

Figure 6:
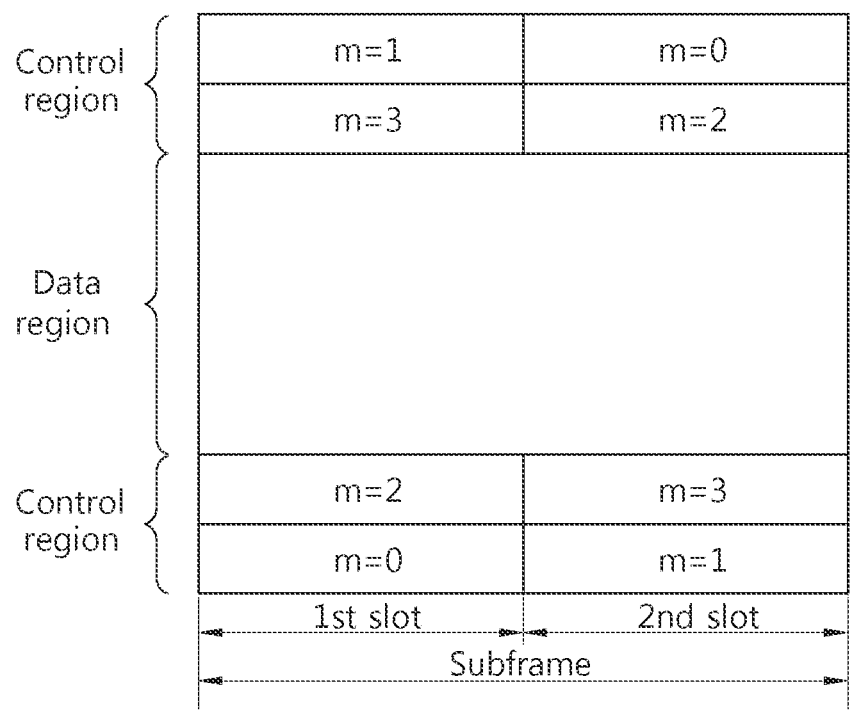
FIG. 6 shows the structure of an uplink sub-frame.
Figure 6:
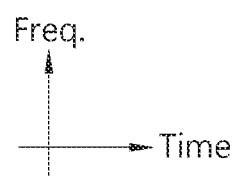

FIG. 6 shows the structure of an uplink sub-frame.

The uplink sub-frame can be divided into a control region and a data region in the frequency domain. The control region is allocated with a Physical Uplink Control Channel (PUCCH) on which uplink control information is transmitted. The data region is allocated with a Physical Uplink Shared Channel (PUSCH) on which data are transmitted. To maintain the characteristic of a single carrier, a user equipment does not transmit the PUCCH and the PUSCH at the same time. The PUCCHs of one user equipment forms a RB pair within a sub-frame and are then allocated. The RBs included in the RB pair occupy different subcarriers of respective slots. It is said that a RB pair allocated to a PUCCH is frequency-hopped at the slot boundary.

The reference signals, in general, are transmitted in a sequence. A specific sequence can be used as the reference signal sequence without special restrictions. A Phase Shift Keying (PSK)-based computer-generated sequence can be used as the reference signal sequence. PSK can include, for example, Binary Phase Shift Keying (BPSK), Quadrature Phase Shift Keying (QPSK), etc. Alternatively, a Constant Amplitude Zero Auto-Correlation (CAZAC) sequence can be used as the reference signal sequence. The CAZAC sequence can include, for example, a Zadoff-Chu (ZC)-based sequence, a ZC sequence with cyclic extension, and a ZC sequence with truncation. Alternatively, a Pseudo-random (PN) sequence can be used as the reference signal sequence. The PN sequence can include, for example, m-sequence, a computer-generated sequence, a Gold sequence, and a Kasami sequence. Further, a cyclically shifted sequence can be used as the reference signal sequence.

A reference signal can be classified into a cell-specific reference signal (CRS), an MBSFN reference signal, and a user equipment-specific reference signal (UE-specific RS). The CRS is transmitted to all the UEs within a cell and used for channel estimation. The MBSFN reference signal can be transmitted in sub-frames allocated for MBSFN transmission. The UE-specific reference signal is received by a specific UE or a specific UE group within a cell, and may be referred to as a dedicated RS (DR). The DRS is chiefly used by a specific UE or a specific UE group for the purpose of data demodulation.

First, a CRS is described.

Figure 7:
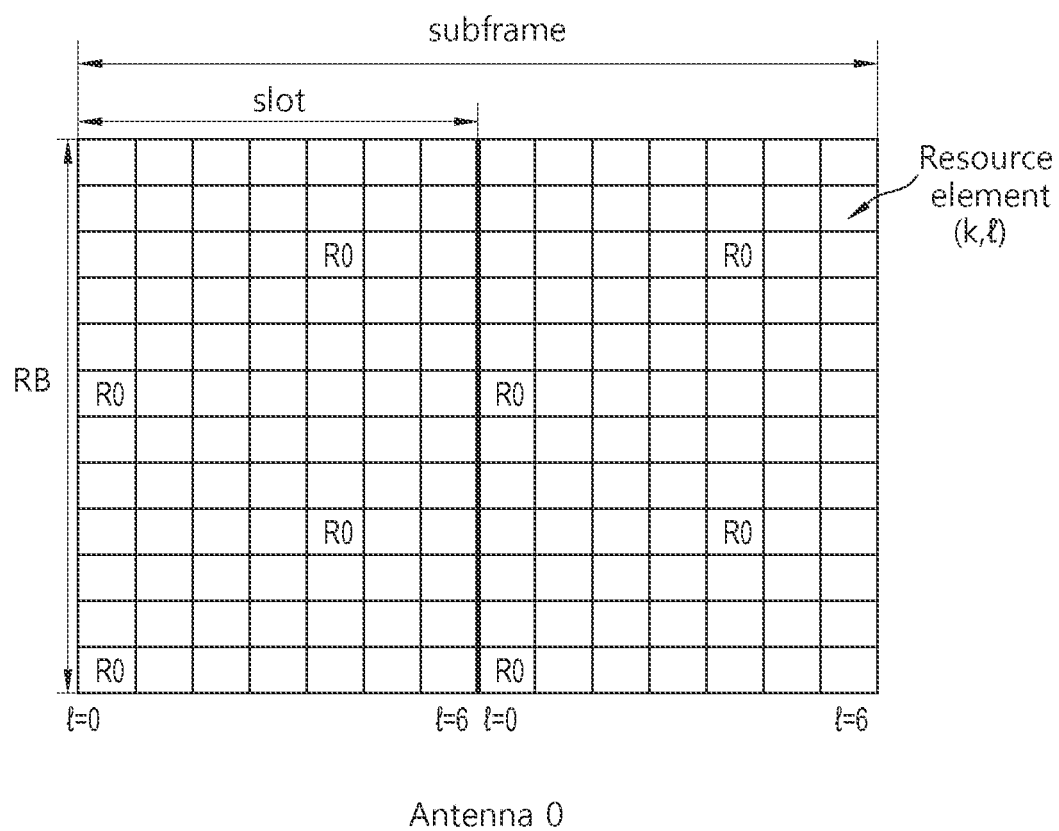
FIG. 7 to FIG. 9 shows an exemplary CS structure.
Figure 8:
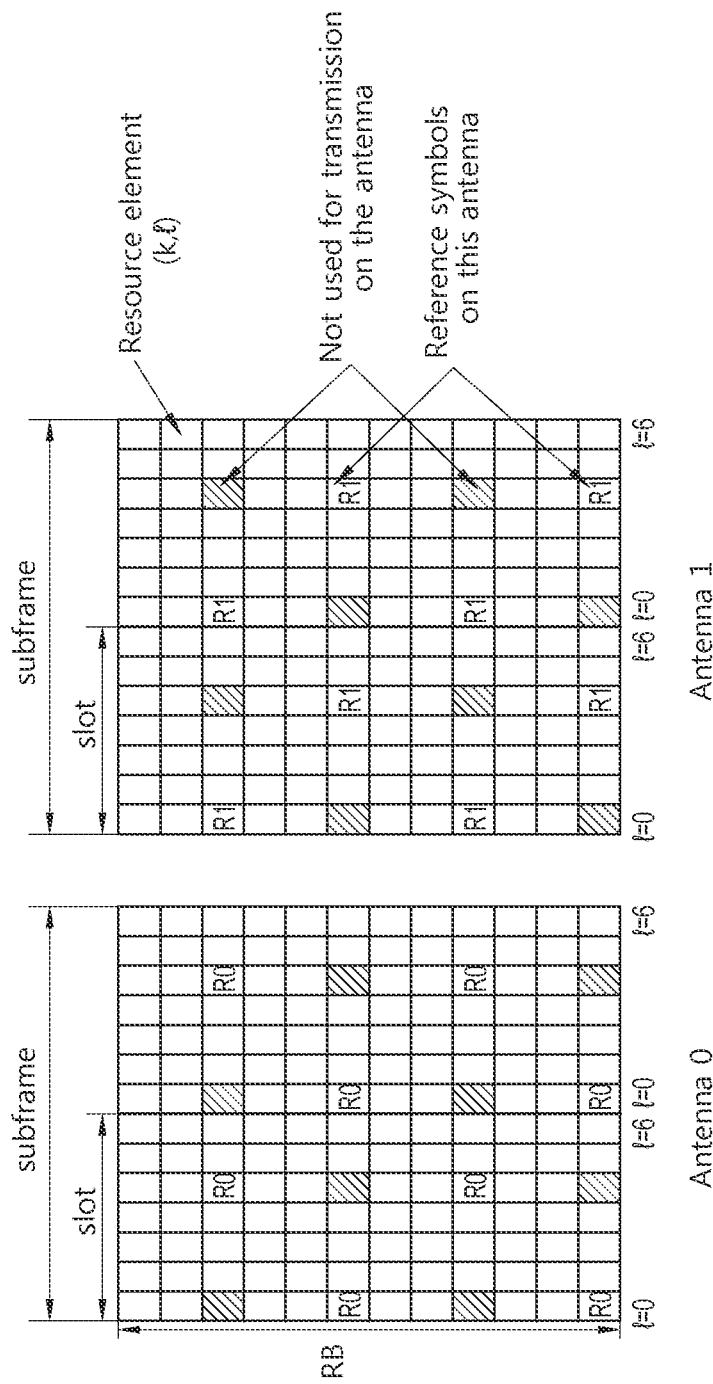
Figure 9:
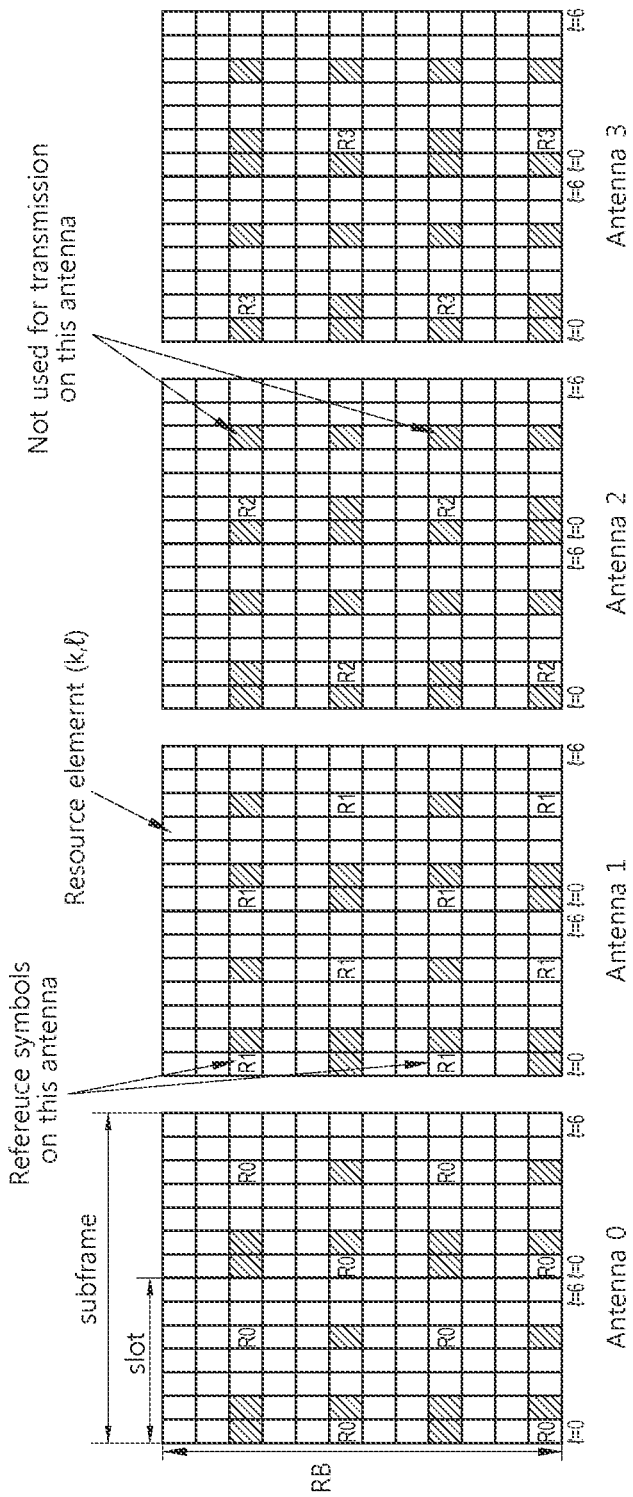

FIG. 7 to FIG. 9 shows an exemplary CS structure. FIG. 7 shows an exemplary CRS structure when a BS uses one antenna. FIG. 8 shows an exemplary CRS structure when a BS uses two antennas. FIG. 9 shows an exemplary CRS structure when a BS uses four antennas. The section 6.10.1 of 3GPP TS 36.211 V8.2.0 (2008-03) may be incorporated herein by reference. In addition, the exemplary CRS structure may be used to support a feature of an LTE-A system. Examples of the feature of the LTE-A system include coordinated multi-point (CoMP) transmission and reception, spatial multiplexing, etc. Also, a CRS may be used for channel quality measurement, CP detection, time/frequency synchronization, etc.

Referring to FIG. 7 to FIG. 9, in multi-antenna transmission, a BS uses a plurality of antennas, each of which has one resource grid. 'R0' denotes an RS for a first antenna, 'R1' denotes an RS for a second antenna, 'R2' denotes an RS for a third antenna, and 'R3' denotes an RS for a fourth antenna. R0 to R3 are located in a subframe without overlapping with one another. l indicates a position of an OFDM symbol in a slot. In case of a normal cyclic prefix (CP), l has a value in the range of 0 to 6. In one OFDM symbol, RSs for the respective antennas are located with a spacing of 6 subcarriers. In a subframe, the number of R0s is equal to the number of R1s, and the number of R2s is equal to the number of R3s. In the subframe, the number of R2s and R3s is less than the number of R0s and R1s. A resource element used for an RS of one antenna is not used for an RS of another antenna. This is to avoid interference between antennas.

The CRS is always transmitted by the number of antennas irrespective of the number of streams. The CRS has an independent RS for each antenna. A frequency-domain position and a time-domain position of the CRS in a subframe are determined irrespective of a UE. A CRS sequence to be multiplied to the CRS is generated also irrespective of the UE. Therefore, all UEs in a cell can receive the CRS. However, a position of the CRS in the subframe and the CRS sequence may be determined according to a cell identifier (ID). The time-domain position of the CRS in the subframe may be determined according to an antenna number and the number of OFDM symbols in a resource block. The frequency-domain position of the CRS in the subframe may be determined according to an antenna number, a cell ID, an OFDM symbol index l, a slot number in a radio frame, etc.

The CRS sequence may be applied on an OFDM symbol basis in one subframe. The CRS sequence may differ according to a cell ID, a slot number in one radio frame, an OFDM symbol index in a slot, a CP type, etc. The number of RS subcarriers for each antenna on one OFDM symbol is 2. When a subframe includes $N_{RB}$ resource blocks in a frequency domain, the number of RS subcarriers for each antenna on one OFDM symbol is $2 \times N_{RB}$. Therefore, a length of the CRS sequence is $2 \times N_{RB}$.

Equation 2 shows an example of a CRS sequence r(m).

$$r(m) = \frac{1}{\sqrt{2}}(1 - 2 \cdot c(2m)) + j\frac{1}{\sqrt{2}}(1 - 2 \cdot c(2m+1)) \quad \text{[Equation 2]}$$

Herein, m is 0, 1, ..., $2N_{RB,max}-1$. $N_{RB,max}$ denotes the number of resource blocks corresponding to a maximum bandwidth. For example, when using a 3GPP LTE system, $N_{RB,max}$ is 110. c(i) denotes a PN sequence as a pseudo-random sequence, and can be defined by a gold sequence having a length of 31. Equation 3 shows an example of a gold sequence c(n).

$$c(n)=(x_1(n+N_C)+x_2(n+N_C)) \mod 2$$

$$x_1(n+31)=(x_1(n+3)+x_1(n)) \mod 2$$

$$x_2(n+31)=(x_2(n+3)+x_2(n+2)+x_2(n+1)+x_2(n)) \mod 2 \quad \text{[Equation 3]}$$

Herein, $N_C$ is 1600, $x_1(i)$ denotes a $1^{st}$ m-sequence, and $x_2(i)$ denotes a $2^{nd}$ m-sequence. For example, the $1^{st}$ m-sequence or the $2^{nd}$ m-sequence can be initialized for each OFDM symbol according to a cell ID, a slot number in one radio frame, an OFDM symbol index in a slot, a CP type, etc.

In case of using a system having a bandwidth narrower than $N_{RB,max}$, a certain part with a length of $2 \times N_{RB}$ can be selected from an RS sequence generated in a length of $2 \times N_{RB,max}$.

The CRS may be used in the LTE-A system to estimate channel state information (CSI). If necessary for estimation of the CSI, channel quality indicator (CQI), a precoding matrix indicator (PMI), a rank indicator (RI), or the like may be reported from the UE. In the LTE-A system, a UE-specific RS can be use in PDSCH demodulation. Here, a PDSCH and a UE-specific RS can comply with the same precoding operation.

In order to estimate a location of a UE, a positioning reference signal (PRS), among reference signals, may be used. In general, the PRS may be transmitted in a particular subframe, and the particular subframe may be any one of a normal subframe or a multimedia broadcast multicast service single frequency network (MBSFN) subframe. A CRS is transmitted from the BS to the UE in the normal subframe by a CRS pattern given in the entire areas of the subframe. Meanwhile, as for the MBSFN subframe, a normal subframe and an MBSFN subframe may be multiplexed according to a time division multiplexing (TDM) scheme in units of subframes, and every subframe may be configured as a dedicated MBSFN subframe in a corresponding carrier. When a normal subframe and an MBSFN subframe are multiplexed in a frame according to the TDM scheme, the CRS is transmitted only in a portion of the entire regions of the subframe in the MBSFN subframe. Here, the region of the MBSFN subframe in which the CRS is transmitted is a region designated as the PDCCH, and the CRS may not be transmitted in a portion designated as a data region. This is because since the MBSFN subframe is designated for a special purpose by the BS, channel quality measurement or a channel state estimation through CRS is not required. The region designated as the PDCCH in the MBSFN subframe may be the first two OFDM symbols of the subframe. For subframe scheduling to estimate a location of a UE, the PRS is required to be transmitted in a normal subframe in any subframes. In this case, however, when the PRS is transmitted in a normal subframe, it may be interfered with by a CRS for a channel estimation or a channel state measurement. The CRS, a cell-specific reference signal, must be necessarily transmitted to every user equipment. Since the CRS is transmitted only in a portion of the MBSFN subframe, unlike a normal subframe, the influence of interference of the CRS may be reduced. Also, in the MBSFN subframe, since a CRC is not transmitted, a hearability problem in which a signal from a neighbor cell is not received because a signal received from a serving cell is so strong can be solved. The hearability problem arises because an ADC level is determined based on the serving cell and signals transmitted from neighbor cells are received to have a level lower than the corresponding ADC level, making it impossible to discriminate the signals.

Figure 10:
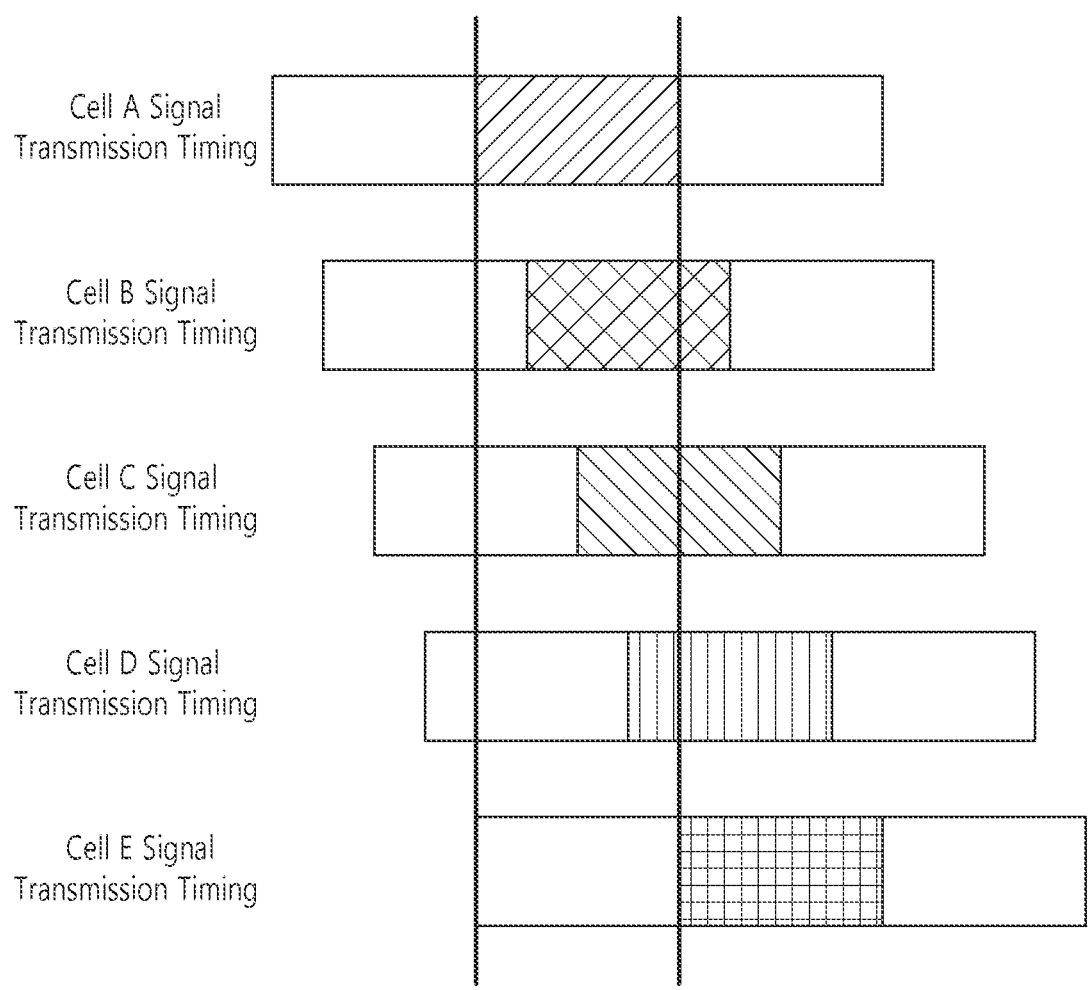
FIG. 10 is a view showing that some positioning subframes transmitted from a plurality of cells are aligned.

FIG. 10 is a view showing that some positioning subframes transmitted from a plurality of cells are aligned.

A subframe set to allow the PRS to be transmitted therein may be called a positioning subframe. In order to prevent a time delay in processing PRSs transmitted from a plurality of cells, the entirety or a portion of positioning subframes are required to be aligned. Accordingly, the UE may process the PRSs transmitted from the plurality of cells at the same time and use it for estimating its location. Here, since a particular frame among radio frames cannot be designated as an MBSFN subframe, so it may not be possible to align the entirety or some of the positioning subframes transmitted from a plurality of cells. Thus, when the PRS is transmitted in the MBSFN subframe, rather than in a normal subframe, the location estimation performance of the UE may be reduced.

As described above, the PRS transmitted in a normal subframe and the PRS transmitted in the MBSFN subframe may be in a trade-off relationship in terms of estimation performance and flexibility of configuration. Thus, the PRS is required to be transmitted in both of a normal subframe and an MBSFN subframe, rather than being transmitted in any one of the normal subframe and the MBSFN subframe. Here, since the CRS patterns of the normal subframe and the MBSFN subframe are different, two types of PRS patterns are required to be configured; one for the normal subframe and the other for the MBSFN subframe. This means that a UE must know whether an IPDL subframe is transmitted based on a normal subframe or based on an MBSFN subframe, which may bring about additional signaling overhead. Also, the UE is burdened with designing different correlators with respect to the two types of PRS patterns. Thus, there is a necessity of introducing an IPDL which can be configured in the normal subframe and the MBSFN subframe, and in this case, the UE is not required to know whether or not the IPDL is currently designated in the normal subframe or in the MBSFN subframe.

Thus, the present invention proposes a PRS pattern for allocating both normal subframe and MBSFN subframe as positioning subframes without any additional signaling with respect to a UE.

The proposed PRS transmission method will be described through embodiments.

Figure 11:
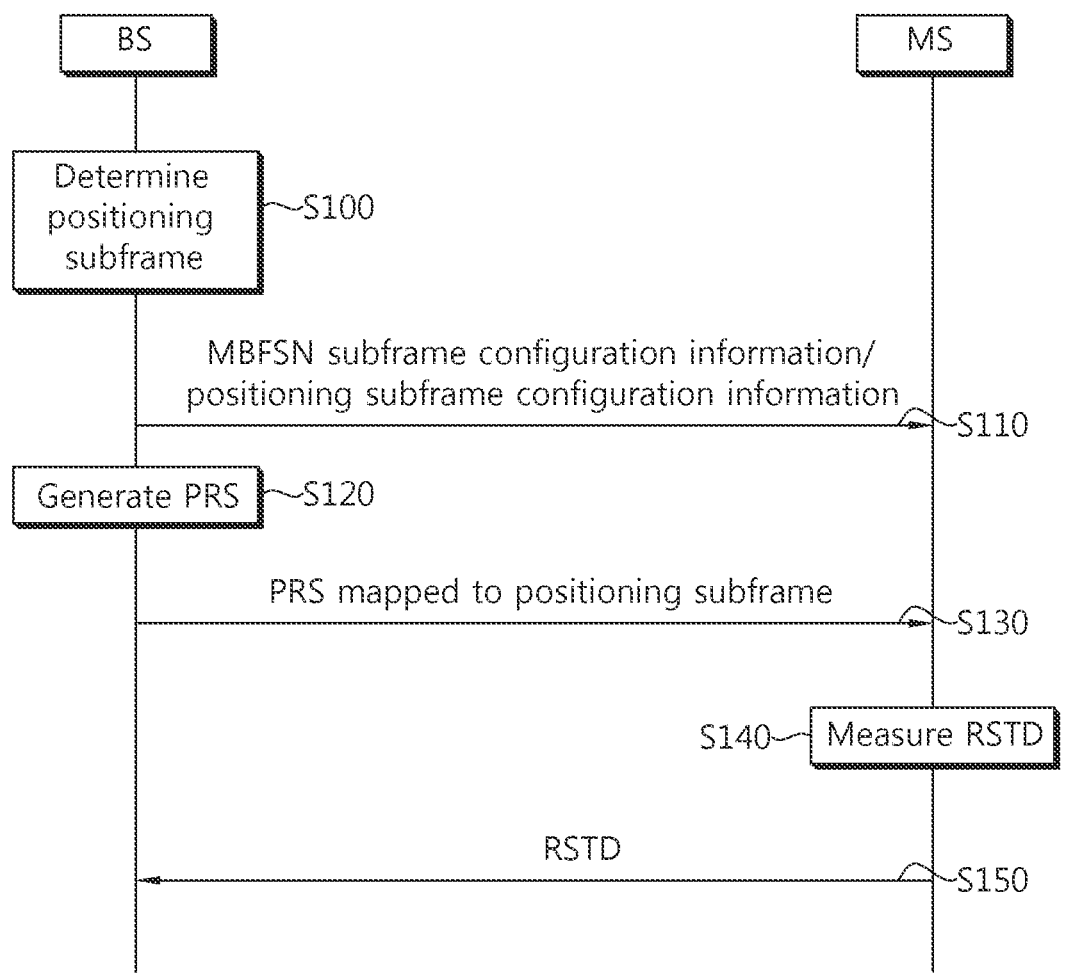
FIG. 11 shows an embodiment of the proposed PRS transmission method.

FIG. 11 shows an embodiment of the proposed PRS transmission method.

In step S100, the BS determines at least one subframe among radio frames including a plurality of downlink subframes, as a positioning subframe.

Each of the downlink subframes include includes a plurality of OFDM symbols in a time domain. Also, each of the OFDM symbols includes a plurality of subcarriers in a frequency domain. Each downlink subframe may be classified as any one of a first type subframe and a second type subframe. Thus, the at least one subframe determined as the positioning subframe may be classified into any one of the first type subframe and the second type subframe. The first type subframe may be a normal subframe in which a CRS is transmitted over the entirety of the subframe. The second type subframe may be an MBSFN subframe in which a CRS is transmitted in first some OFDM symbols, in particular, only in a region designated as a PDCCH. The positioning subframe configuration information and the type configuration of each downlink subframe may be transmitted to the UE. When the first type subframe is a normal subframe and the second type subframe is an MBSFN subframe, the downlink subframe configuration information may define a downlink subframe allocated as an MBSFN subframe among downlink subframes, and the downlink subframe configuration information may be transmitted through a radio resource control (RRC) message. Also, at least one subframe designated as the positioning subframe may be a plurality of N number of contiguous downlink subframes.

In step S110, the UE receives the downlink subframe configuration information and the positioning subframe configuration information.

Upon receiving the downlink subframe configuration information, the UE is able to recognize whether the downlink subframe transmitted to the UE is a normal subframe or an MBSFN subframe. Also, at the UE side, in order to measure relative cell-specific power of a plurality of cells and a cell-specific time delay offset, the UE is required to receive corresponding position subframe configuration information from the BS. Through the downlink subframe configuration information and the positioning subframe configuration information, the UE is able to recognize whether the received positioning subframe is a normal subframe or an MBSFN subframe. Here, no matter whether the corresponding positioning subframe is a normal subframe or an MBSFN subframe based on the received positioning subframe configuration information, if the corresponding subframe has been designated as a positioning subframe, the UE recognizes that a PRS pattern having the same structure is used irrespective of the configuration of the subframe, so the UE may process the PRS received in the corresponding positioning subframe to estimate a location thereof. The positioning subframe configuration information may be signaled to at least one UE or a UE group when necessary by applying an event-trigger scheme, or a positioning subframe including information regarding a period of the positioning subframe may be periodically allocated.

In step S120, the BS generates a PRS.

In step S130, the BS maps the generated PRS to at least one positioning subframe based on a single PRS pattern and transmits the same to the UE.

The BS may map the PRS based on a single PRS pattern regardless of whether or not the subframe in which the PRS is transmitted is a normal subframe or an MBSFN subframe. Since the BS maps the PRS based on the single PRS pattern, the UE may process the PRS received through the positioning subframe by using a single correlator. The single PRS pattern may include a sequence of OFDM symbols to which the PRS is mapped. The PRS may be mapped to the sequence of OFDM symbols, at regular intervals of six subcarriers.

The single PRS pattern may vary according to the length of a CP of OFDM symbols within the at least one positioning subframe and/or the number of PBCH transmission antenna ports. The number of PBCH transmission antenna ports may be the number of physical antennas or logical antennas. When the OFDM symbol in the at least one positioning subframe has a normal CP and the number of PBCH transmission antenna ports is 1 or 2, the single PRS pattern may include a sequence of fourth, sixth, seventh, ninth, tenth, eleventh, thirteenth, and fourteenth OFDM symbols (OFDM symbol indexes 3, 5, 6, 8, 9, 10, 12, and 13). When the OFDM symbol in the at least one positioning subframe has a normal CP and the number of PBCH transmission antenna ports is 4, the single PRS pattern may include a sequence of fourth, sixth, seventh, tenth, eleventh, thirteenth, and fourteenth OFDM symbols (OFDM symbol indexes 3, 5, 6, 9, 10, 12, and 13). When the OFDM symbol in the at least one positioning subframe has an extended CP and the number of PBCH transmission antenna ports is 1 or 2, the single PRS pattern may include a sequence of fifth, sixth, eighth, ninth, eleventh, and twelfth OFDM symbols (OFDM symbol indexes 4, 5, 7, 8, 10, and 11). When the OFDM symbol in the at least one positioning subframe has an extended CP and the number of PBCH transmission antenna ports is 4, the single PRS pattern may include a sequence of fifth, sixth, ninth, eleventh, and twelfth OFDM symbols (OFDM symbol indexes 4, 5, 8, 10, and 11).

Also, when the at least one radio frame includes two or more positioning subframes, and the two or more positioning subframes may include both normal subframe and MBSFN subframe. A PRS pattern of a positioning subframe designated as a normal subframe and that of a positioning subframe designated as an MBSFN subframe may be the same. A particular OFDM symbol of a normal subframe is used to transmit a CRS, so when the PRS pattern in the normal subframe and the PRS pattern in the MBSFN subframe are the same, nothing may be transmitted in the particular OFDM symbol in the MBSFN subframe. By making the PRS pattern of the normal subframe and the MBSFN subframe the same, even when the MBSFN subframe is used, each cell may dispose the CRS and the PRS such that there is no interference at the CRS side, the PRSs transmitted from the respective cells may be aligned over the entirety of a portion of the subframe. Also, when a positioning subframe in which the PRS is transmitted is designated as an MBSFN subframe, the PRS transmission in the MBSFN subframe may have the same CP configuration as that of a normal subframe. For example, when the normal subframe uses a normal CP, the MBSFN subframe may use the normal CP. Since a first subframe (subframe index 0) of a radio frame is a normal subframe, the CP configuration of the MBSFN subframe may follow the CP configuration of the first subframe (subframe index 0) of the radio frame in which the MBSFN subframe is included.

In step S140, the UE measures a reference signal time difference (RSTD) by using the PRS transmitted from each cell.

In step S150, the UE transmits the measured RSTD to the BS.

According to the proposed PRS transmission method, regardless of whether or not a subframe is a normal subframe or an MBSFN subframe, when the corresponding subframe is designated as a positioning subframe, each cell may transmit the PRS, rather than data which was originally scheduled to be transmitted in the corresponding positioning subframe. On the assumption that there is one serving cell and one neighbor cell, when positioning subframes designated in the serving cell and the neighbor cell are all normal subframes, each cell may transmit the PRS, rather than data, in the corresponding normal subframes. When a positioning subframe designated in the serving cell is a normal subframe and a positioning subframe designated in the neighbor cell is an MBSFN subframe, the serving cell may transmit the PRS, rather than data, in the normal subframe, and the neighbor cell may also transmit the PRS, rather than a data part, in the corresponding MBSFN subframe. The same goes for the case in which the positioning subframe designated in the serving cell is an MBSFN subframe. Also, the proposed PRS transmission method can also be extended when there is a plurality of neighbor cells.

Figure 12:
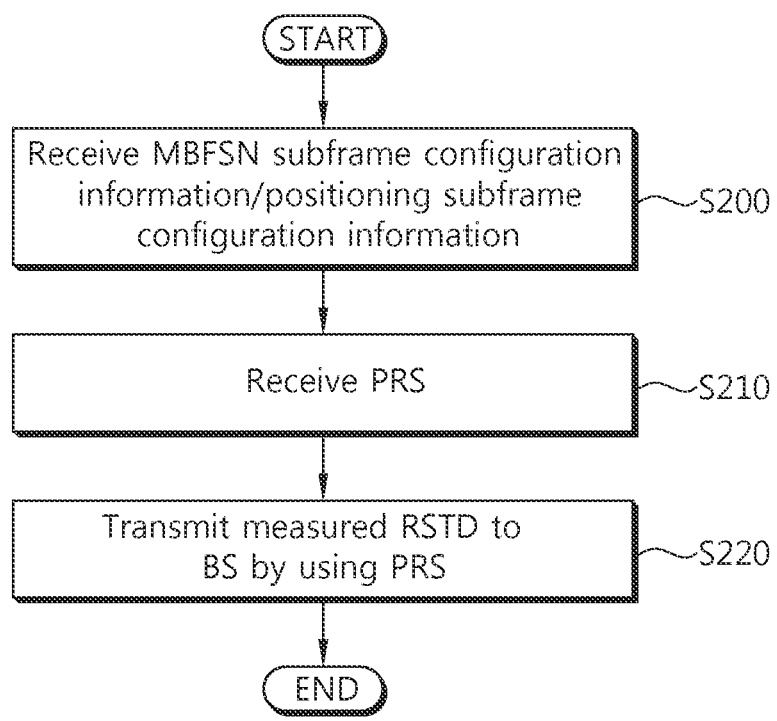
FIG. 12 shows an embodiment of a method for reporting the difference in time between PRSs received from a plurality of cells.

FIG. 12 shows an embodiment of a method for reporting the difference in time between PRSs received from a plurality of cells.

In step S200, the UE obtains downlink subframe configuration information and positioning subframe configuration information from the BS. Based on the downlink subframe configuration information, a plurality of downlink subframes in a radio frame can be classified into any one of a first type subframe and a second type subframe. The first type subframe may be a normal subframe and the second type subframe may be an MBSFN subframe. Each of the downlink subframes includes a plurality of OFDM symbols in the time domain, and each of the OFDM symbols includes a plurality of subcarriers in the frequency domain. Also, based on the positioning subframe configuration information, at least one of the plurality of downlink subframes may be determined as a positioning subframe. The at least one positioning subframe may be any one of the first type subframe and the second type subframe.

In step S210, the UE receives PRSs from a plurality of cells in the at least one positioning subframe.

In step S220, the UE measures a timing difference between the PRSs transmitted from the plurality of cells and reports the same to the BS. When each of the PRSs is mapped to the at least one positioning subframe and transmitted, each of the PRSs may be mapped based on a single PRS pattern irrespective of the type of the subframe according to the downlink subframe configuration. The single PRS pattern may vary according to the length of the CP of the OFDM symbols in the at least one positioning subframe and/or the number of PBCH transmission antenna ports.

Figure 13:
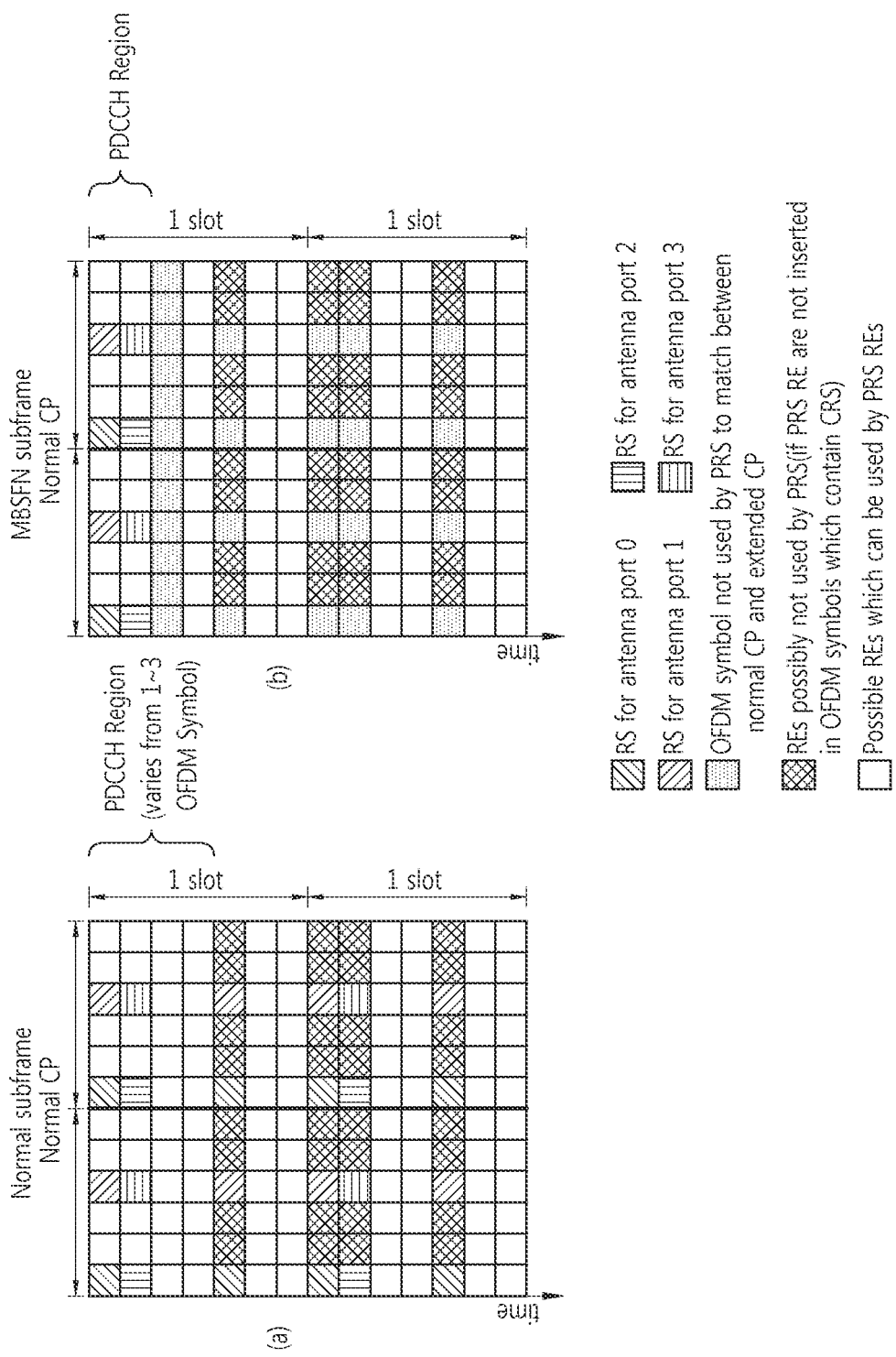
FIG. 13 to FIG. 18 shows an example of a subframe structure according to the proposed PRS transmission method.
Figure 14:
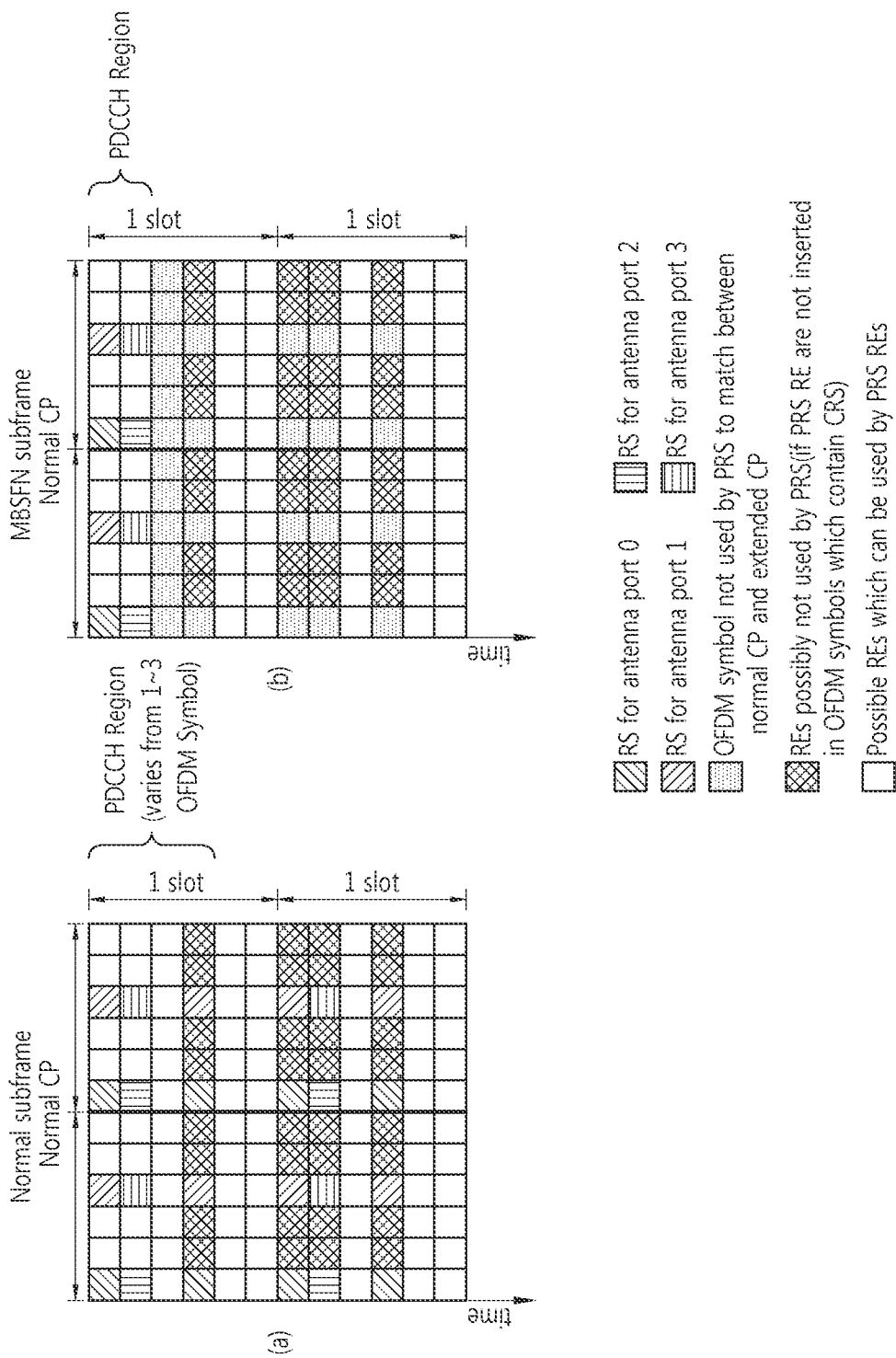

FIGS. 13 and 14 show an example of a subframe structure according to the proposed PRS transmission method.

FIG. 13 shows a case of a normal CP. In the normal subframe in FIG. 13(a), first three OFDM symbols may be used as a PDCCH region. Also, in the normal subframe, CRSs of four antennas (antenna ports 0 to 3) are transmitted. The CRSs of the four antennas are transmitted in first, second, fifth, eighth, ninth, and twelfth OFDM symbols (OFDM symbol indexes 0, 1, 4, 7, 8, and 11). In an MBSFN subframe which has a CP as shown in FIG. 13(b) and corresponds to the normal subframe, CRSs of four antennas (antenna ports 0 to 3) are transmitted in the first and second OFDM symbols (OFDM symbol indexes 0, 1). In the third OFDM symbol (OFDM symbol index 2), a PRS may be punctured, which corresponds to the PDCCH region of the normal subframe. In the normal subframe, the PRS is not transmitted in a resource element of the MBSFN subframe corresponding to a resource element in which the CRS is transmitted. Also, when the PRS is not transmitted in an OFDM symbol in which the CRS is transmitted in the normal frame, the PRS may not be transmitted in every resource element of the corresponding OFDM symbol. Thus, the OFDM symbol, in which the PRS can be transmitted, may be at least one OFDM symbol among the fourth, sixth, seventh, tenth, eleventh, thirteenth, and fourteenth OFDM symbols (OFDM symbol indexes 3, 5, 6, 9, 10, 12, and 13) of the MBSFN subframe.

FIG. 14 shows a case of an extended CP. Like the case of FIG. 13, in FIG. 14, an OFDM symbol, in which the PRS can be transmitted, may be at least one OFDM symbol among the fifth, sixth, ninth, eleventh, and twelfth OFDM symbols (OFDM symbol indexes 4, 5, 8, 10, and 11) of the MBSFN subframe.

In the MBSFN subframe, in a blocking OFDM symbol in which the PRS cannot be transmitted, nothing is transmitted or dummy transmission may be performed. When nothing is transmitted in the blocking OFDM symbol, a transition problem may arise in an RF unit which receives the subframe. Thus, any one of a virtual CRS, a virtual PRS before being punctured, and a certain signal may be transmitted in the blocking OFDM symbol.

FIGS. 15 to 18 show another example of subframe structures according to the proposed PRS transmission method.

The subframe structures of FIGS. 15 to 18 are based on the assumption that two transmission antennas (antenna ports 0 and 1) are used.

Figure 15:
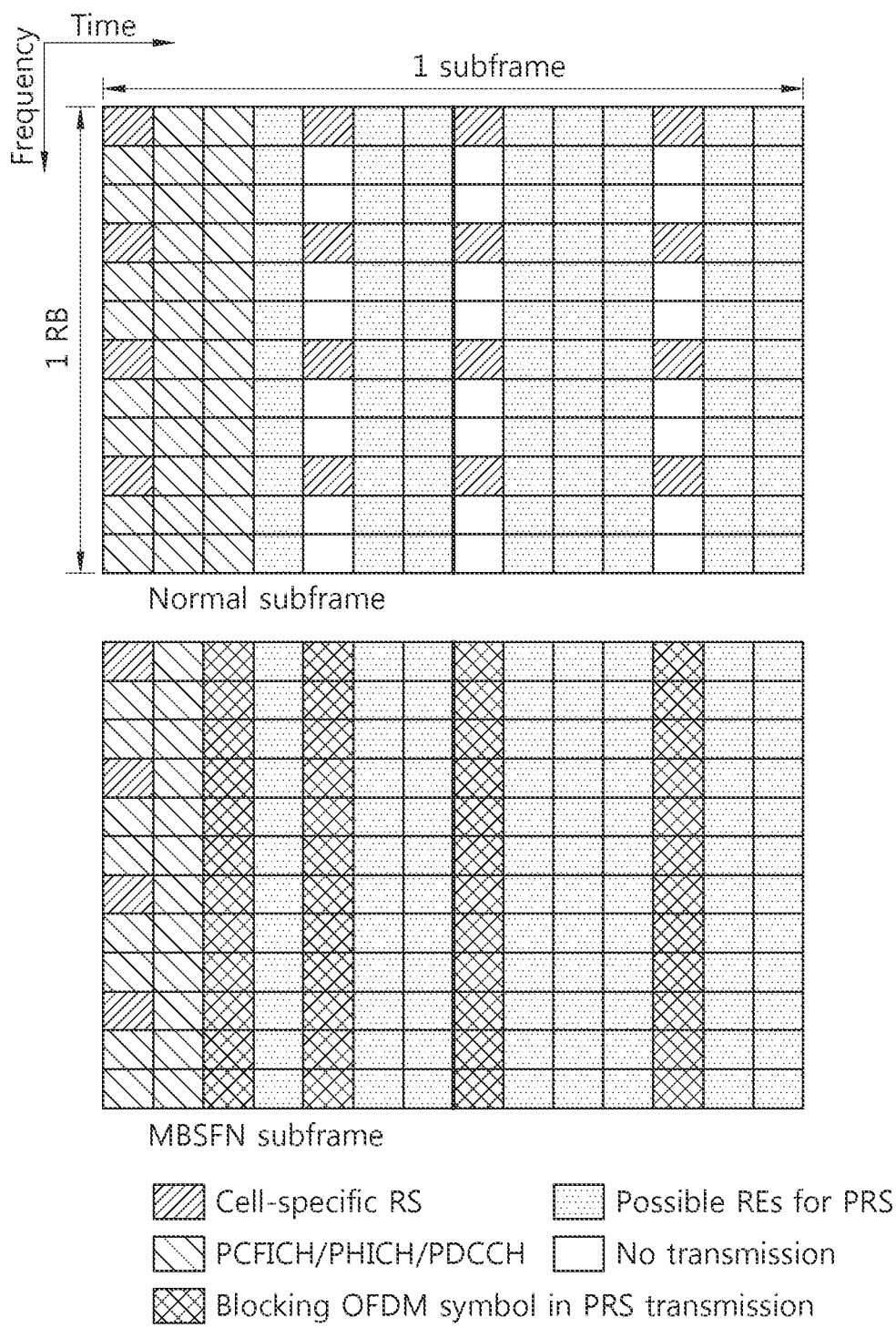

FIG. 15 shows a case of a normal CP. In the normal subframe of FIG. 15(a), an OFDM symbol, in which the PRS can be transmitted, may be at least any one OFDM symbol among the fourth, sixth, seventh, ninth, tenth, eleventh, thirteenth, and fourteenth OFDM symbols (OFDM symbol indexes 3, 5, 6, 8, 9, 10, 12, and 13) excluding OFDM symbols which are used as the PDCCH region and in which the CRS is transmitted. In the MBSFN subframe of FIG. 15(b), an OFDM symbol in which the PRS can be transmitted is the same as that of the normal subframe.

Figure 16:
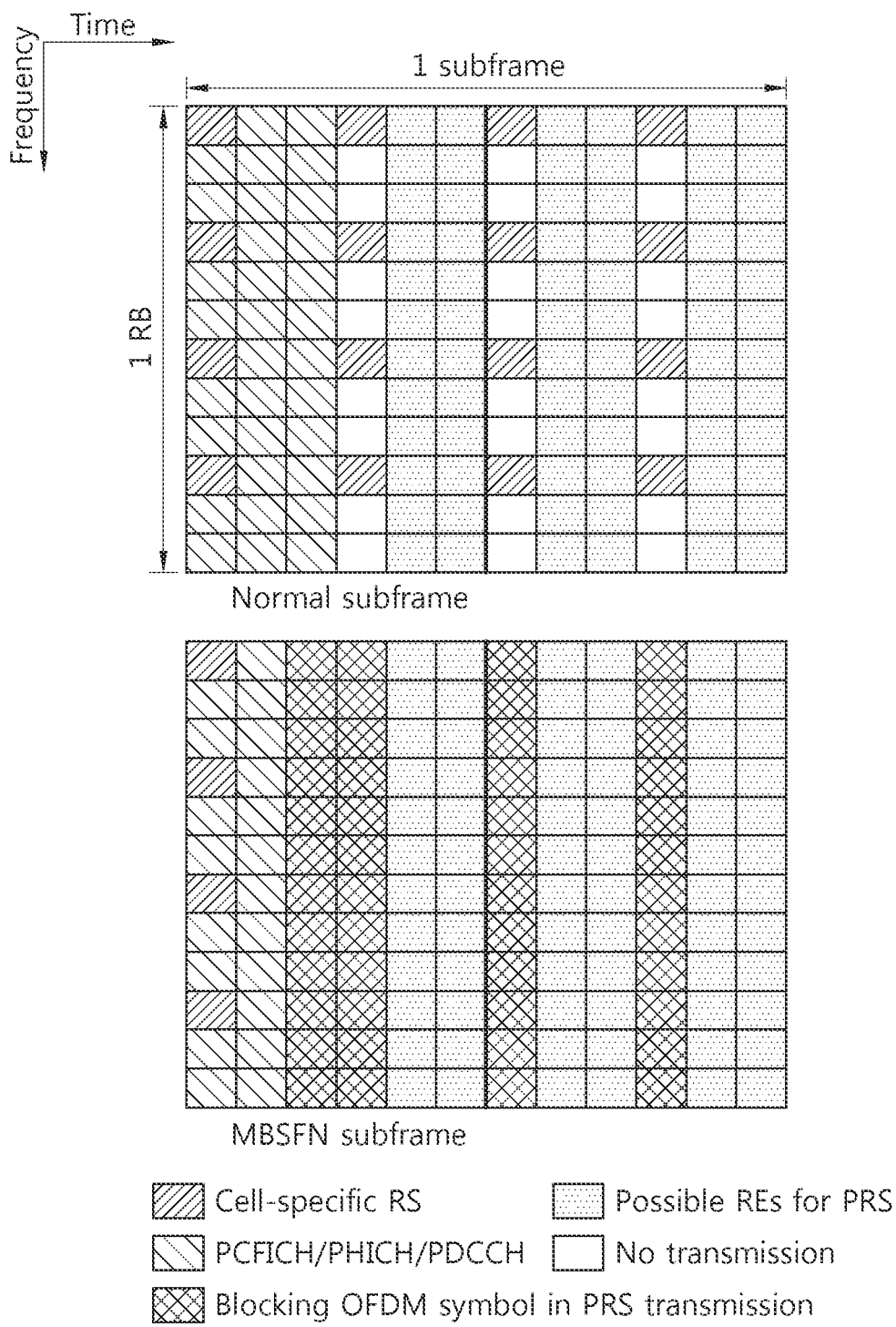

FIG. 16 shows a case of an extended CP. In the normal subframe of FIG. 16(a), an OFDM symbol, in which the PRS can be transmitted, may be at least any one OFDM symbol among the fifth, sixth, eighth, ninth, eleventh, and twelfth OFDM symbols (OFDM symbol indexes 4, 5, 7, 8, 10, and 11) excluding OFDM symbols which are used as the PDCCH region and in which the CRS is transmitted. In the MBSFN subframe of FIG. 16(b), an OFDM symbol in which the PRS can be transmitted is the same as that of the normal subframe.

Figure 17:
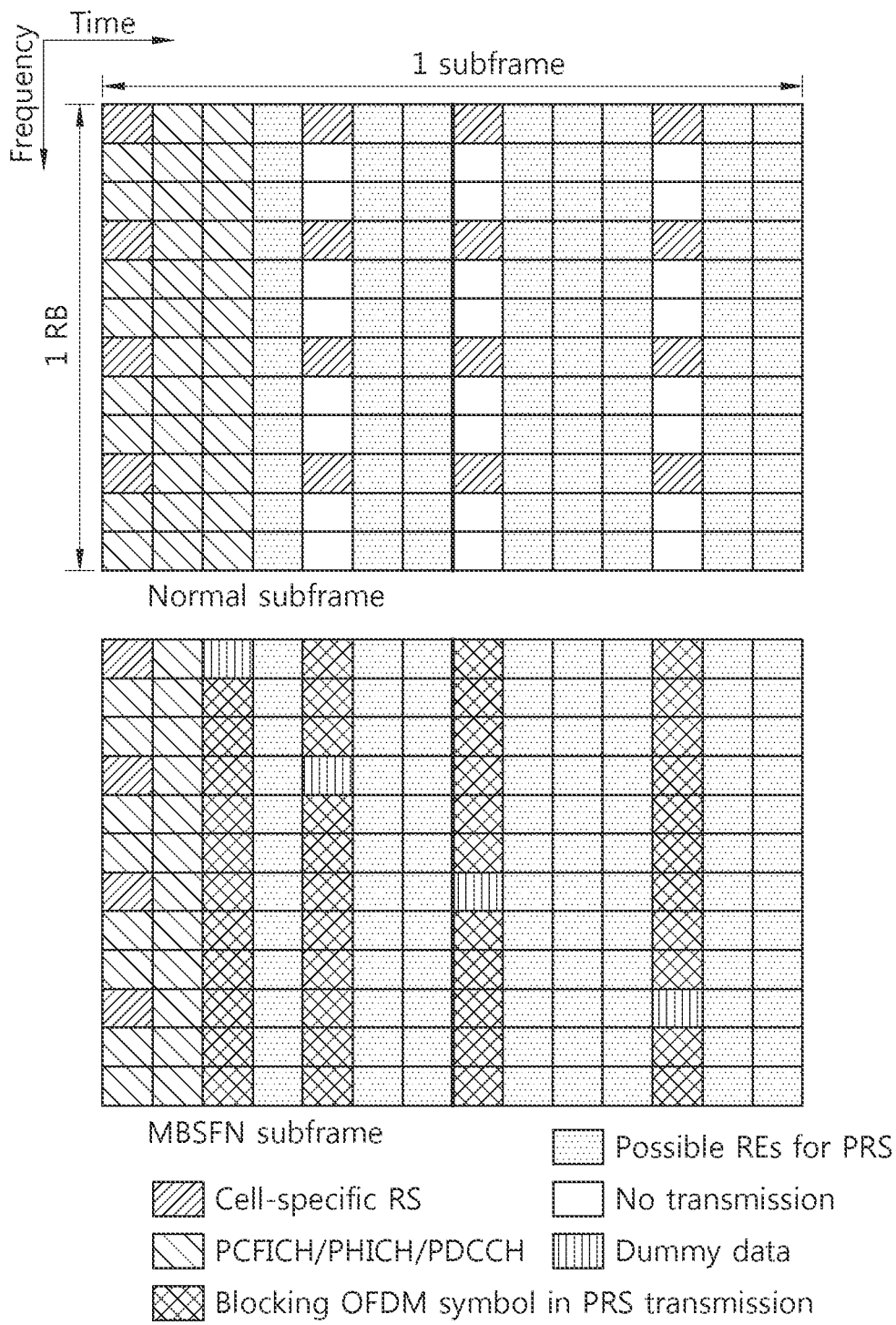
Figure 18:
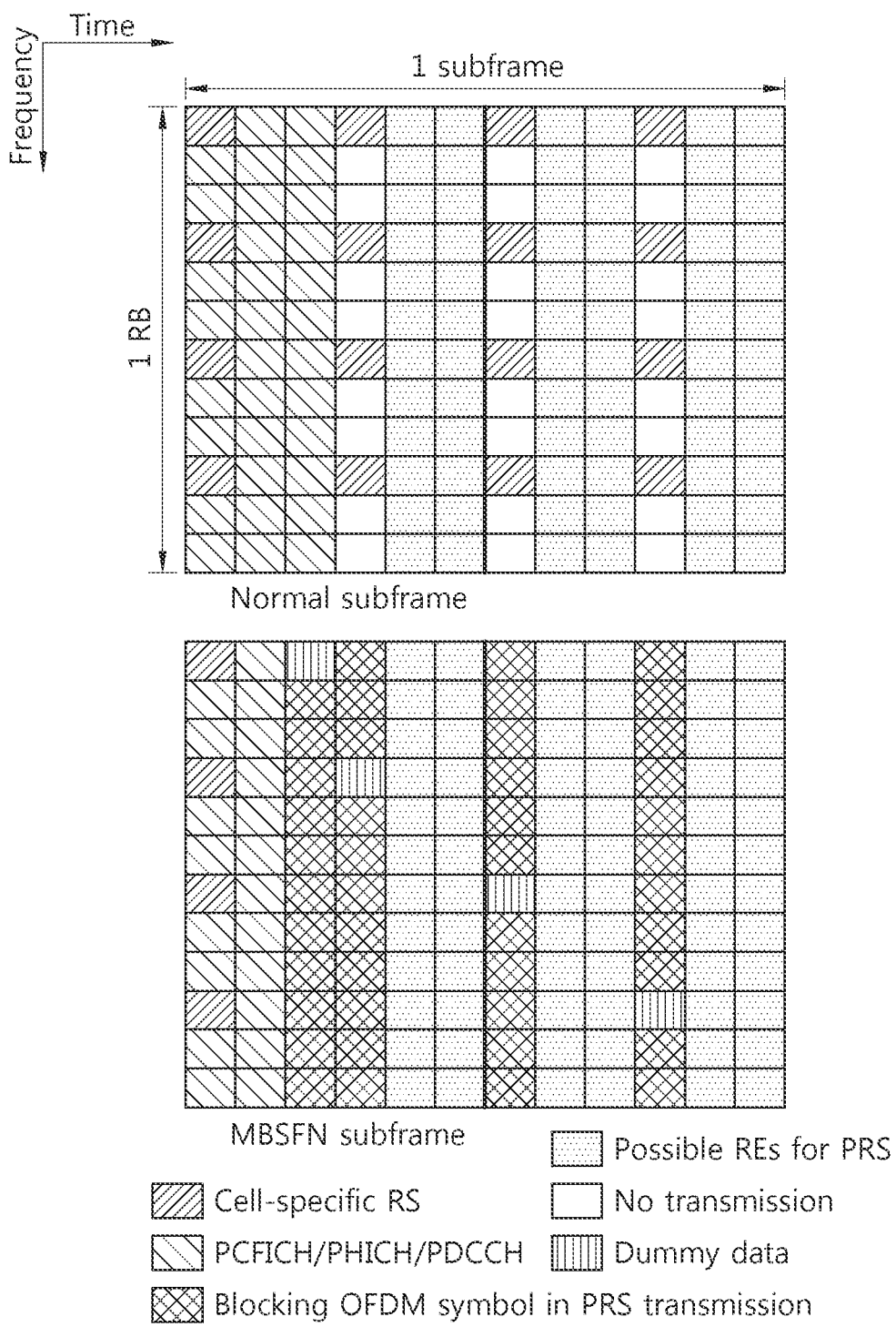

FIG. 17 shows a case in which dummy data is additionally transmitted in the subframe structure of FIG. 15. Dummy data are mapped to the third, fifth, eighth, and twelfth OFDM symbols (OFDM symbol indexes 2, 4, 7, and 11) in which PRS is not transmitted, and transmitted therein. FIG. 18 shows a case in which dummy data is additionally transmitted in the subframe structure of FIG. 16. Dummy data are mapped to the third, fourth, seventh, and tenth OFDM symbols (OFDM symbol indexes 2, 3, 6, and 9) in which PRS is not transmitted, and transmitted therein.

The PRS pattern mapped to the normal subframe or the MBSFN subframe may be a form which repeats the pattern defined in a basis block. Each cell transmitting the PRS may have a different PRS pattern based on each basis block.

Figure 19:
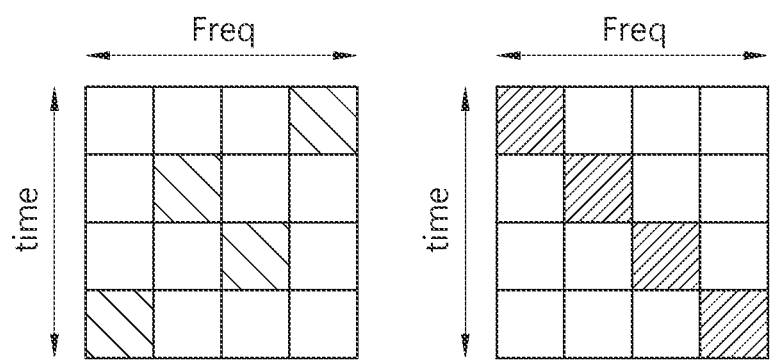
FIG. 19 shows an example of a basis block constituting a PRS pattern.

FIG. 19 shows an example of a basis block constituting a PRS pattern.

The basis block may be a matrix having a size of N*N. The column of the matrix may represent the frequency domain, and the row of the matrix may represent the time domain. In the basis block of FIG. 19, the PRS may be mapped to shaded regions. With reference to FIG. 19, there is only one shaded region in each row and each column. The matrix having such a configuration as shown in FIG. 19 may be called a Latin Square matrix.

The basis block may vary according to a cell ID. In each cell, in order to cover the entire bandwidth, the respective basis blocks are repeated and the PRS can be mapped accordingly. When the PRS is mapped to one resource block of a PRS subframe, it may be punctured in order to match a particular row or a particular column of the basis block to the one resource block. When the PRS is mapped to a plurality of resource blocks of the PRS subframe, the pattern of the PRS mapped to the one resource block is maintained and mapped as it is to the plurality of resource blocks.

Or, a basis block may be formed according to Equation defined according to a certain rule. It is assumed that the length of a PRS sequence is N and Np=N+1. Here, a subcarrier index k of lth OFDM symbol of the PRS subframe may be determined by Equation 4 shown below:

$$k_l = (a^{nID} \cdot (l+1)) \bmod N_p - 1 \qquad \text{[Equation 4]}$$

In Equation 4, Np may be the smallest prime number greater than N, and $a^{nID}$ may be a cell ID or a function related to frequency reuse. For example, when a reuse factor is 6, it may be $a^{nID} = (N_{ID}^{cell} \bmod 6 + 1)$. If (N+1) is the smallest prime number greater than N, subcarrier index k of the lth OFDM symbol of the PRS subframe may be determined by Equation 5 shown below:

$$k_l = ((a^{nID} \cdot (l+1)) \bmod N_p - 1) \bmod N \quad \text{[Equation 5]}$$

Equation 6 below shows an example of a basis block having a size of 12*12 generated by Equation 4 or Equation 5.

$$\begin{pmatrix} 0 & 6 & 8 & 9 & 7 & 10 & 1 & 4 & 2 & 3 & 5 & 11 \\ 1 & 0 & 4 & 6 & 2 & 8 & 3 & 9 & 5 & 7 & 11 & 10 \\ 2 & 7 & 0 & 3 & 10 & 6 & 5 & 1 & 8 & 11 & 4 & 9 \\ 3 & 1 & 9 & 0 & 5 & 4 & 7 & 6 & 11 & 2 & 10 & 8 \\ 4 & 8 & 5 & 10 & 0 & 2 & 9 & 11 & 1 & 6 & 3 & 7 \\ 5 & 2 & 1 & 7 & 8 & 0 & 11 & 3 & 4 & 10 & 9 & 6 \\ 6 & 9 & 10 & 4 & 3 & 11 & 0 & 8 & 7 & 1 & 2 & 5 \\ 7 & 3 & 6 & 1 & 11 & 9 & 2 & 0 & 10 & 5 & 8 & 4 \\ 8 & 10 & 2 & 11 & 6 & 7 & 4 & 5 & 0 & 9 & 1 & 3 \\ 9 & 4 & 11 & 8 & 1 & 5 & 6 & 10 & 3 & 0 & 7 & 2 \\ 10 & 11 & 7 & 5 & 9 & 3 & 8 & 2 & 6 & 4 & 0 & 1 \\ 11 & 5 & 3 & 2 & 4 & 1 & 10 & 7 & 9 & 8 & 6 & 0 \end{pmatrix} \quad \text{[Equation 6]}$$

Figure 20:
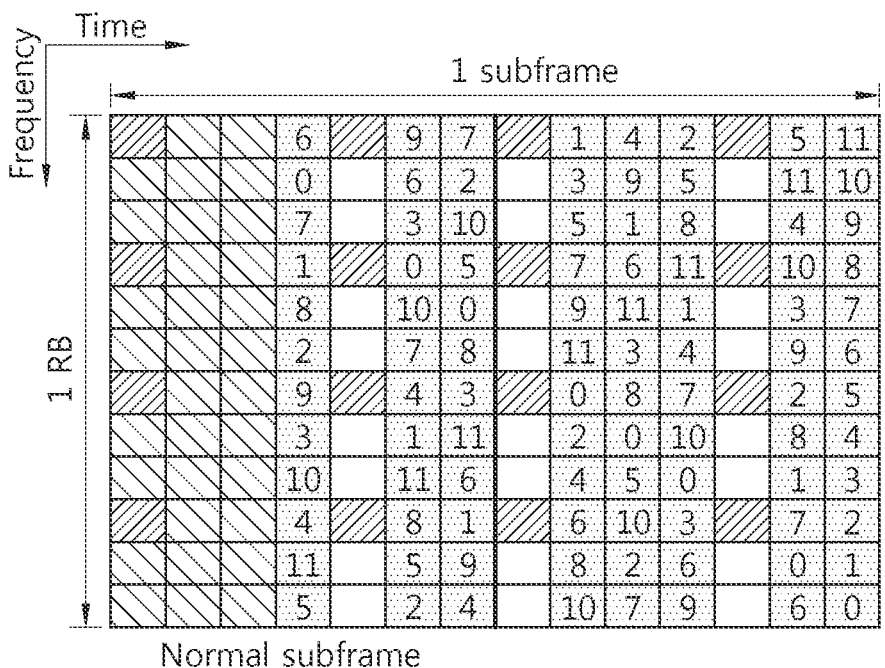
FIG. 20 and FIG. 21 show an example of a PRS pattern according to the proposed PRS transmission method.
Figure 20:
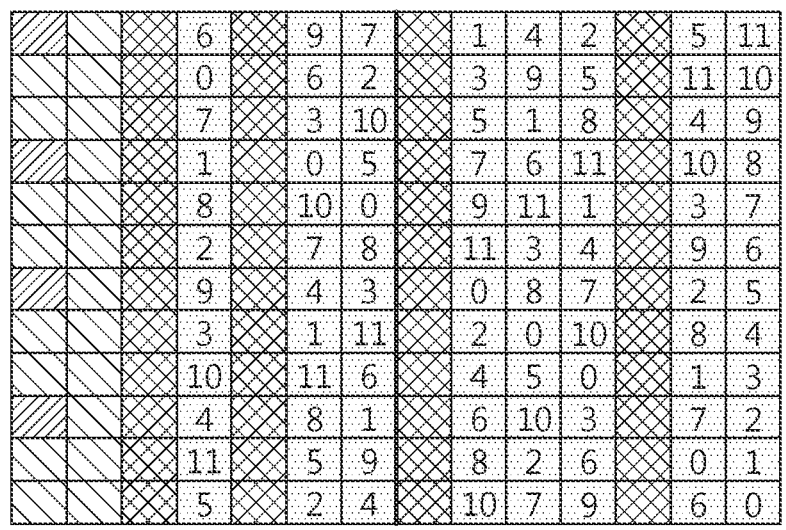

FIG. 20 shows an example of a PRS pattern according to the proposed PRS transmission method. The basis block of Equation 6 is matched to the third OFDM to fourteenth OFDM symbols (OFDM symbol indexes 2 to 13) of a normal subframe of FIG. 20(a) and an MBSFN subframe of FIG. 20(b). The PRS is punctured in the third, fifth, eighth, and eleventh OFDM symbols (OFDM symbol indexes, 2, 4, 7, and 10) in which the PRS cannot be transmitted. Accordingly, the PRS pattern mapped to the fourth, sixth, seventh, ninth, tenth, eleventh, thirteenth, and fourteenth OFDM symbols (OFDM symbol indexes 3, 5, 6, 8, 9, 10, 12, and 13) of FIG. 20(a) are determined based on the matrix elements of the second, fourth, fifth, seventh, eighth, ninth, eleventh, and twelfth columns of Equation 6. The PRS pattern of the MBSFN subframe of FIG. 20(b) is the same as the normal subframe of FIG. 20(a). The UE can receive the PRSs transmitted from a plurality of cells without collision by virtue of the PRS pattern.

Equation 7 shows an example of a basis block having a size of 6*6 generated by Equation 4 or Equation 5.

$$\begin{pmatrix} 0 & 3 & 4 & 1 & 2 & 5 \\ 1 & 0 & 2 & 3 & 5 & 4 \\ 2 & 4 & 0 & 5 & 1 & 3 \\ 3 & 1 & 5 & 0 & 4 & 2 \\ 4 & 5 & 3 & 2 & 0 & 1 \\ 5 & 2 & 1 & 4 & 3 & 0 \end{pmatrix} \quad \text{[Equation 7]}$$

Figure 21:
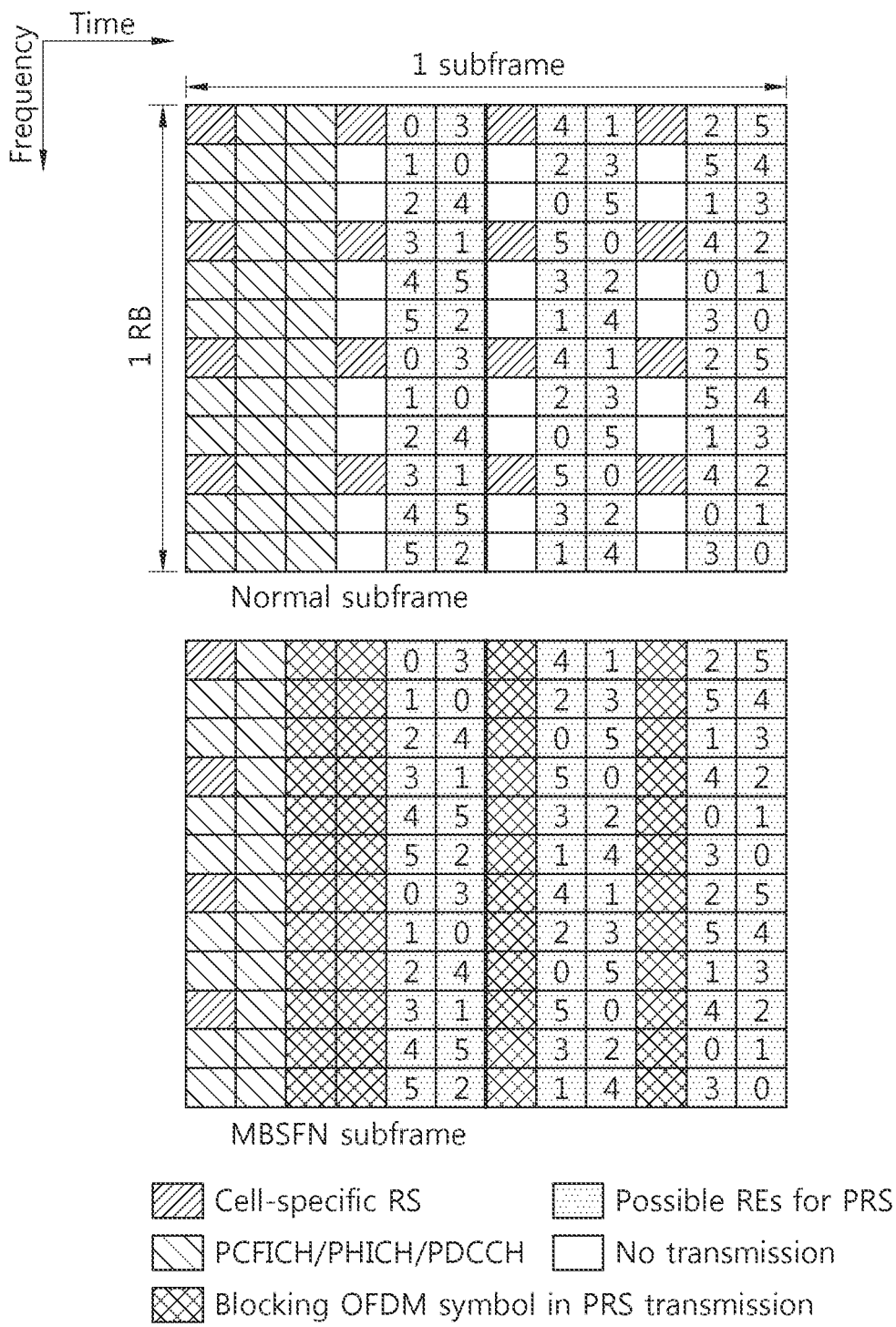

FIG. 21 shows another example of the PRS pattern according to the proposed PRS transmission method. The basis block of Equation 7 is matched to OFDM symbols to which the PRS can be mapped in a normal subframe of FIG. 21(a) and an MBSFN subframe of FIG. 21(b). The PRS pattern mapped to the fifth, sixth, eighth, ninth, eleventh, and twelfth OFDM symbols (OFDM symbol indexes 4, 5, 7, 8, 10, and 11) of FIG. 21(a) are determined based on the matrix elements of the first to sixth columns of Equation 7. The PRS pattern of the MBSFN subframe of FIG. 21(b) is the same as the normal subframe of FIG. 21(a). The UE can receive the PRSs transmitted from a plurality of cells without collision by virtue of the PRS pattern.

Figure 22:
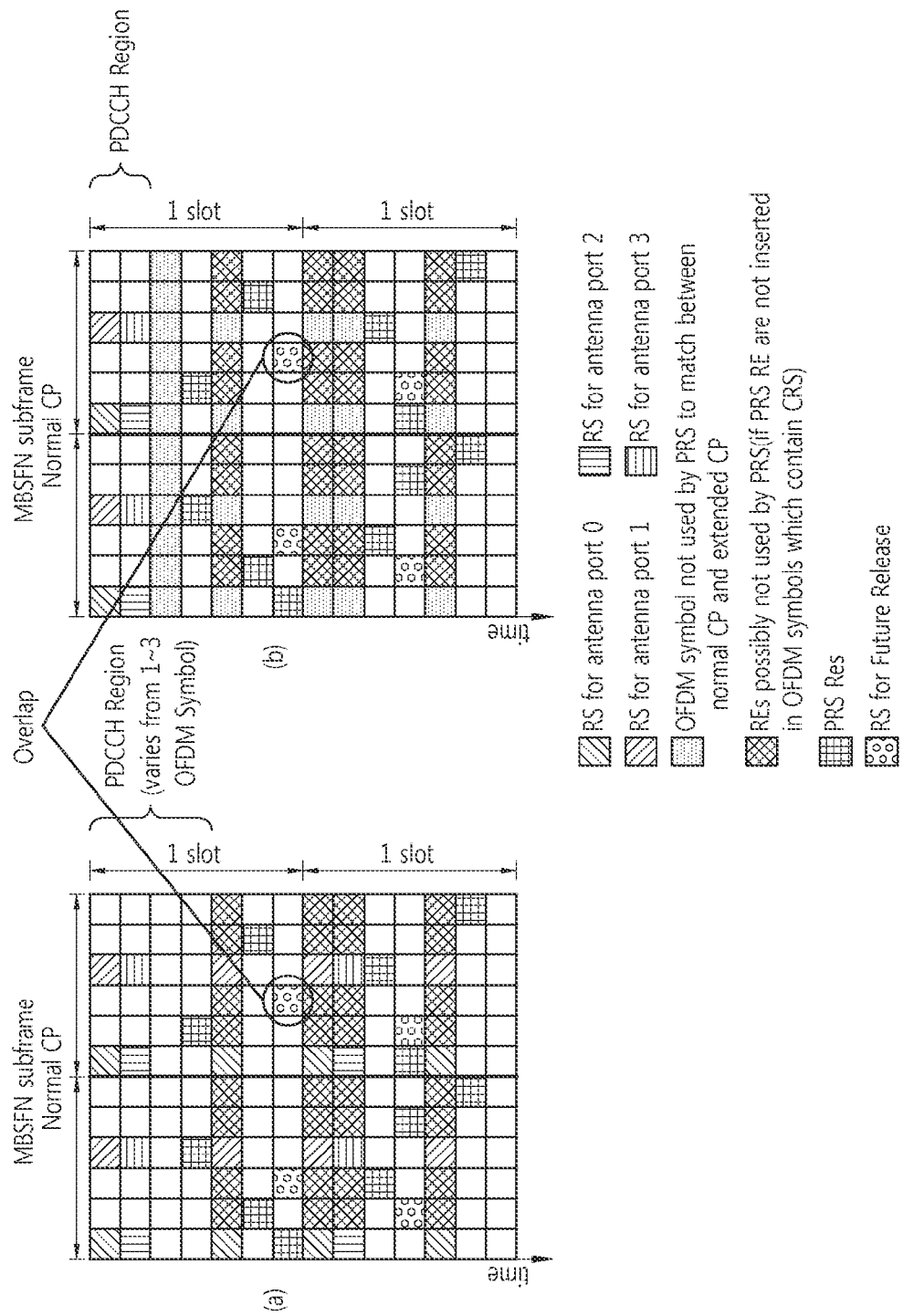
FIG. 22 shows a case in which resource elements to which the PRS is mapped and resource elements to which a different reference signal is mapped overlap.

FIG. 22 shows a case in which resource elements to which the PRS is mapped and resource elements to which a different reference signal is mapped overlap.

When the PRS is transmitted in both the normal subframe and the MBSFN subframe, the resource elements to which the PRS is mapped and the resource elements to which a reference signal (referred t as a 'special reference signal', hereinafter) which may be added later may overlap. In this case, the PRS and the special reference signal may be superposed in the corresponding resource elements and simultaneously transmitted. However, the PRS and the special reference signal may collide to reduce the location estimation performance of the UE or the performance of the operation performed by using the special reference signal. In order to avoid this problem, only any one of the PRS and the special reference signal may be transmitted in the corresponding resource elements. For example, when only the PRS, rather than the special reference signal, is transmitted, the performance of the operation performed by using the special reference signal may be reduced, but there is no influence on the location estimation performance of the UE by using the PRS. Conversely, when only the special reference signal, rather than the PRS, is transmitted, the location estimation performance of the UE may be reduced, but the performance of the operation performed by using the special reference signal may not be reduced.

In estimating the location of the UE, an existing CRS, rather than the PRS, may be used. When the location of the UE is estimated by using the CRS, a CRS transmitted from a neighbor cell may not be accurately received due to the intensive transmission power of the serving cell. Thus, in the subframe in which the CRS of the neighbor cell is transmitted, the serving cell may mute or reduce transmission power of the corresponding PDSCH region of a subframe thereof, to allow the UE to accurately receive the CRS transmitted from the neighbor cell.

Figure 23:
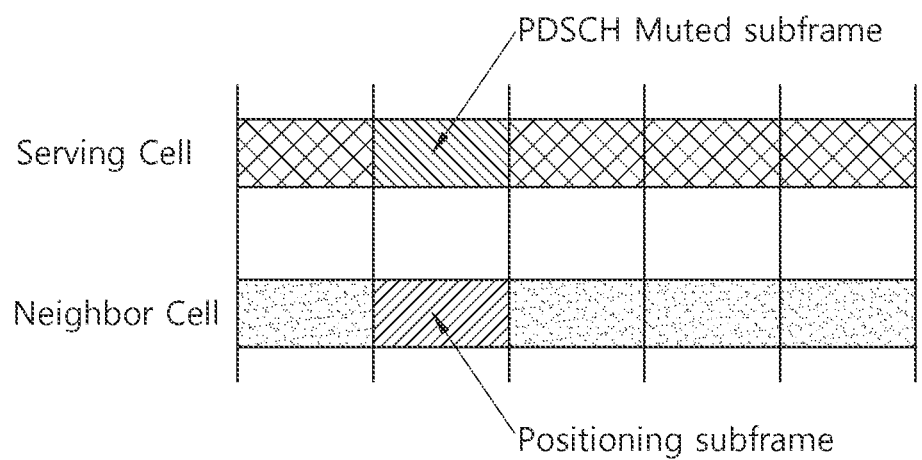
FIGS. 23 and 24 show the subframe of the serving cell and that of the neighbor cell according to the method for estimating a location of the UE by using the CRS.
Figure 24:
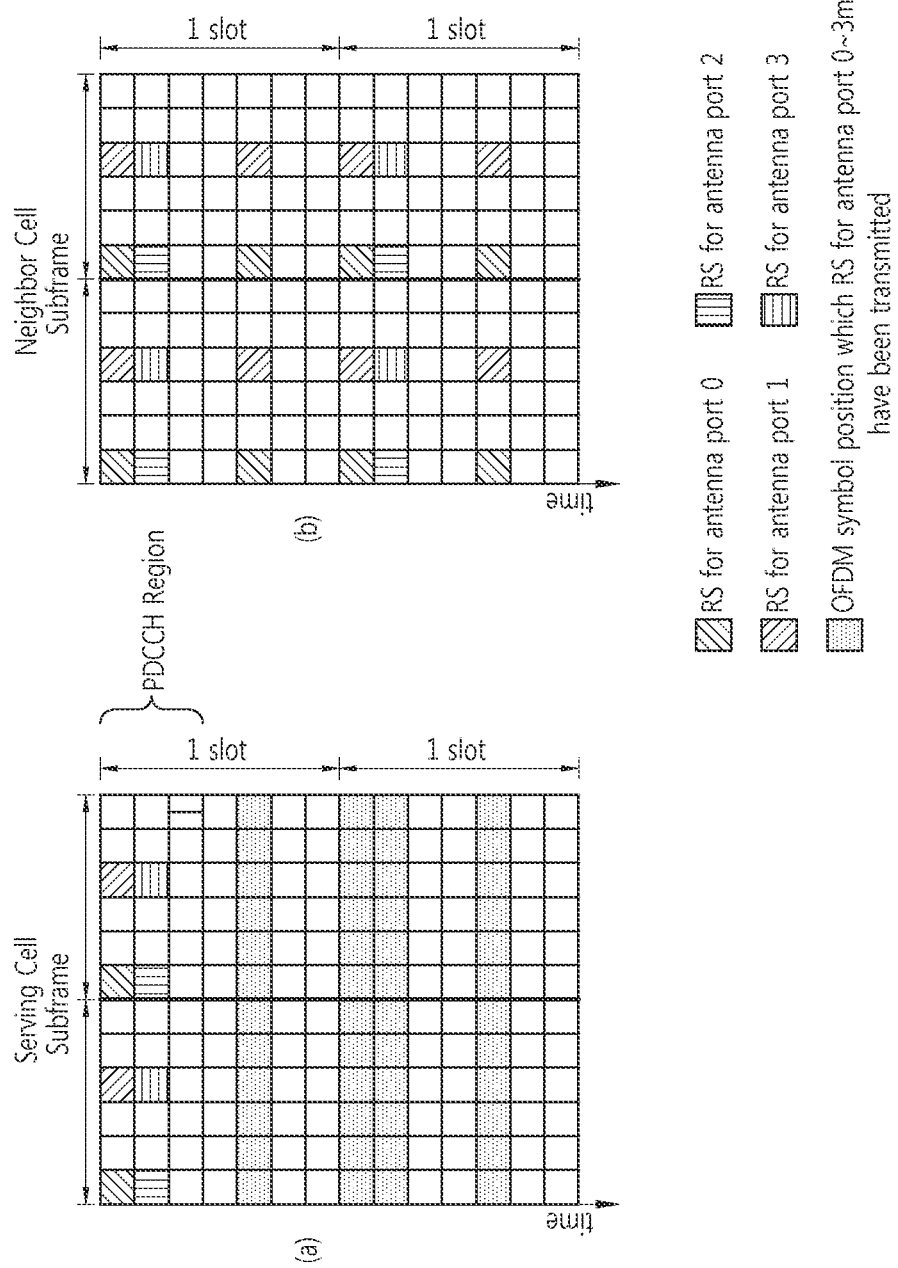

FIGS. 23 and 24 show the subframe of the serving cell and that of the neighbor cell according to the method for estimating a location of the UE by using the CRS.

With reference to FIG. 23, transmission power of the PDSCH in the subframe of the serving cell corresponding to the positioning subframe in which the neighbor cell transmits the CRS may be muted. Referring to FIG. 24, transmission power of the PDSCH in the OFDM symbol of the serving cell corresponding to the OFDM symbol in which the neighbor cell transmits the CRS may be muted. The subframe of the serving cell may be an MBSFN subframe. Accordingly, the CRS transmitted from the neighbor cell can be more accurately received.

Figure 25:
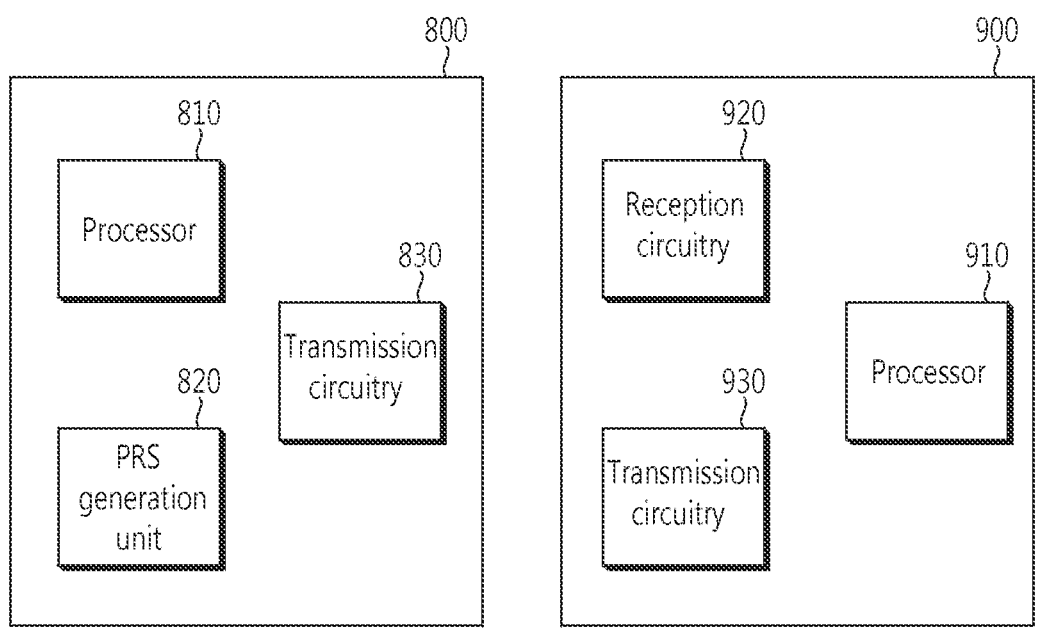
FIG. 25 is a schematic block diagram showing a BS and a UE implementing an embodiment of the present invention.

FIG. 25 is a schematic block diagram showing a BS and a UE implementing an embodiment of the present invention.

A BS 800 includes a processor 810, a PRS generation unit 820, and a transmission circuitry 830. The processor 810 determines at least one subframe of a radio frame including a plurality of downlink subframes, as a positioning subframe, and maps a PRS generated by the PRS generation unit 820 to the at least one positioning subframe based on a single PRS pattern. The PRS generation unit 820 generates a PRS. The transmission circuitry 830 transmits the PRS in the at least one positioning subframe. The processor 810 may map the PRS based on the single PRS pattern regardless of whether or not the subframe in which the PRS is transmitted is a normal subframe or an MBSFN subframe. The single PRS pattern may vary according to the length of a CP of OFDM symbols within the at least one positioning subframe and/or the number of PBCH transmission antenna ports.

A UE 900 includes a processor 910, a reception circuitry 920, and a transmission circuitry 930. The reception circuitry 920 is configured to receive a PRS in at least one positioning subframe from a plurality of cells. The transmission circuitry 930 is configured to report a timing difference between PRSs transmitted from the plurality of cells. The processor 910 is configured to receive positioning subframe configuration information and downlink subframe configuration information, and measure the timing difference between the PRSs transmitted from the plurality of cells. Based on the downlink subframe configuration information, a plurality of downlink subframes in a radio frame can be classified into any one of a first type subframe and a second type subframe. The first type subframe may be a normal subframe and the second type subframe may be an MBSFN subframe. Each of the downlink subframes includes a plurality of OFDM symbols in the time domain, and each of the OFDM symbols includes a plurality of subcarriers in the frequency domain. Also, based on the positioning subframe configuration information, at least one of the plurality of downlink subframes may be determined as a positioning subframe. The at least one positioning subframe may be any one of the first type subframe and the second type subframe. Also, the PRS may be mapped based on a single PRS pattern regardless of a type of the at least one positioning subframe. The single PRS pattern may vary according to the length of the CP of the OFDM symbol in the at least one positioning subframe and/or the number of PBCH transmission antenna ports.

The present invention can be implemented using hardware, software, or a combination of them. In the hardware implementations, the present invention can be implemented using an Application Specific Integrated Circuit (ASIC), a Digital Signal Processor (DSP), a Programmable Logic Device (PLD), a Field Programmable Gate Array (FPGA), a processor, a controller, a microprocessor, other electronic unit, or a combination of them, which is designed to perform the above-described functions. In the software implementations, the present invention can be implemented using a module performing the above functions. The software can be stored in a memory unit and executed by a processor. The memory unit or the processor can use various means which are well known to those skilled in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope and spirit of the present disclosure.

What has been described above includes examples of the various aspects. It is, of course, not possible to describe every conceivable combination of components or methodologies for purposes of describing the various aspects, but one of ordinary skill in the art may recognize that many further combinations and permutations are possible. Accordingly, the subject specification is intended to embrace all such alternations, modifications and variations that fall within the spirit and scope of the appended claims.

What is claimed is:

1. A method comprising:
receiving, by a terminal, a frame that includes a plurality of subframes, the plurality of subframes including both a normal subframe and a multimedia broadcast multicast service single frequency network (MBSFN) subframe,
wherein the normal subframe is a subframe where a cell-specific reference signal (CRS) is transmitted in the entire subframe,
wherein the MBSFN subframe is a subframe where the CRS is transmitted in only a part of the entire subframe,
wherein the normal subframe is configurable for including two different cyclic prefix (CPs) lengths, a normal length and an extended length as compared to the normal length,
wherein a plurality of positioning reference signals (PRSs) are included in both the normal subframe and the MBSFN subframe,
wherein the normal subframe is configured to include one of the two different CP lengths, wherein the one of the two different CP lengths is the normal length,
wherein a length of a CP of the MBSFN subframe is the same as the length of the CP of the normal subframe.

2. The method of claim 1, wherein the plurality of subframes is consecutive.

3. The method of claim 1,
wherein a PRS pattern of the normal subframe is the same as a PRS pattern of the MBSFN subframe such that locations of the plurality of PRSs in the normal subframe are the same as locations of respective ones of the plurality of PRSs in the MBSFN subframe, and
wherein the PRS pattern, of both the normal subframe and the MBSFN subframe, is defined by a unit of a subframe in a time domain, and by a unit of a resource block (RB) in a frequency domain.

4. The method of claim 3,
wherein the PRS pattern, of both the normal subframe and the MBSFN subframe, include a sequence of orthogonal frequency division multiplexing (OFDM) symbols where the plurality of PRSs are mapped to the plurality of subframes, and
wherein the plurality of PRSs are mapped to the sequence of OFDM symbols in thein a PRS pattern with a 6 subcarrier interval regularly.

5. The method of claim 3, wherein the PRS pattern, of both the normal subframe and the MBSFN subframe, is determined based on number of physical broadcast channel (PBCH) transmission antenna ports.

6. The method of claim 5, wherein:
the PRS pattern, of both the normal subframe and the MBSFN subframe, include a sequence of fourth OFDM symbol, sixth OFDM symbol, seventh OFDM symbol, ninth OFDM symbol, tenth OFDM symbol, eleventh OFDM symbol, thirteenth OFDM symbol, and fourteenth OFDM symbol.

7. The method of claim 5, wherein:
the PRS pattern, of both the normal subframe and the MBSFN subframe, include a sequence of fourth OFDM symbol, sixth OFDM symbol, seventh OFDM symbol, tenth OFDM symbol, eleventh OFDM symbol, thirteenth OFDM symbol, and fourteenth OFDM symbol.

8. The method of claim 3, wherein the PRS pattern, of both the normal subframe and the MBSFN subframe, is defined by a unit of subframe including 12 or 14 OFDM symbols.

9. The method of claim 1, wherein each of the plurality of PRSs is generated by using a sequence as shown:

$$r(m) = \frac{1}{\sqrt{2}}(1 - 2 \cdot c(2m)) + j\frac{1}{\sqrt{2}}(1 - 2 \cdot c(2m+1))$$

where m is 0, 1, . . . , $2N_{RB}^{max}-1$,
$2N_{RB}^{max}$ is the number of resource blocks corresponding to a maximum bandwidth, and
c(i) denotes a PN sequence as a pseudo-random sequence, which can be defined by a gold sequence having a length of 31.

10. The method of claim 1, further comprising:
using, by the terminal, the plurality of PRSs included in both the normal subframe and the MBSFN subframe to estimate a location of the terminal.

11. The method of claim 1, wherein the normal subframe is a non-MBSFN subframe.

12. A method, comprising:
generating, by a base station, a frame that includes a plurality of subframes, the plurality of subframes including both a normal subframe and a multimedia broadcast multicast service single frequency network (MBSFN) subframe,
wherein the normal subframe is a subframe where a cell-specific reference signal (CRS) is transmitted in the entire subframe,
wherein the MBSFN subframe is a subframe where the CRS is transmitted in only a part of the entire subframe,
wherein the normal subframe is configurable for including two different cyclic prefix (CPs) lengths, a normal length and an extended length as compared to the normal length,
wherein a plurality of positioning reference signals (PRSs) are included in both the normal subframe and the MBSFN subframe,
wherein the normal subframe is configured to include one of the two different CP lengths, wherein the one of the two different CP lengths is the normal length,
wherein a length of a CP of the MBSFN subframe is the same as the length of the CP of the normal subframe; and
transmitting the frame.

13. The method of claim 12,
wherein a PRS pattern of the normal subframe is the same as a PRS pattern of the MBSFN subframe such that locations of the plurality of PRSs in the normal subframe are the same as locations of respective ones of the plurality of PRSs in the MBSFN subframe, and
wherein the PRS pattern, of both the normal subframe and the MBSFN subframe, is defined by a unit of a subframe in a time domain, and by a unit of a resource block (RB) in a frequency domain.

14. The method of claim 12, wherein the normal subframe is a non-MBSFN subframe.

* * * * *